(12) United States Patent
Faybishenko et al.

(10) Patent No.: US 7,512,649 B2
(45) Date of Patent: Mar. 31, 2009

(54) DISTRIBUTED IDENTITIES

(75) Inventors: Yaroslav Faybishenko, Berkeley, CA (US); John D. Beatty, San Francisco, CA (US); Steve Waterhouse, San Francisco, CA (US)

(73) Assignee: Sun Microsytems, Inc., Santa Clara, CA (US)

( * ) Notice: Subject to any disclaimer, the term of this patent is extended or adjusted under 35 U.S.C. 154(b) by 1598 days.

(21) Appl. No.: 10/194,821

(22) Filed: Jul. 12, 2002

(65) Prior Publication Data

US 2003/0182421 A1 Sep. 25, 2003

Related U.S. Application Data

(60) Provisional application No. 60/366,839, filed on Mar. 22, 2002.

(51) Int. Cl.
*G06F 15/16* (2006.01)
(52) U.S. Cl. .......................... 709/201; 709/202; 709/227
(58) Field of Classification Search ................. 709/202, 709/205, 227–237, 218, 248–250
See application file for complete search history.

(56) References Cited

U.S. PATENT DOCUMENTS

| | | | |
|---|---|---|---|
| 5,479,514 A | 12/1995 | Klonowski | |
| 5,619,657 A | 4/1997 | Sudama et al. | |
| 5,627,892 A | 5/1997 | Kauffman | |
| 5,745,574 A | 4/1998 | Muftic | |
| 5,896,503 A | 4/1999 | Badovinatz et al. | |
| 5,987,446 A | 11/1999 | Corey et al. | |
| 6,029,161 A * | 2/2000 | Lang et al. | 707/1 |
| 6,029,192 A | 2/2000 | Hill et al. | |
| 6,078,914 A | 6/2000 | Redfern | |
| 6,134,550 A | 10/2000 | Van Oorschot et al. | |
| 6,182,136 B1 | 1/2001 | Ramanathan et al. | |
| 6,269,099 B1 | 7/2001 | Borella et al. | |
| 6,446,113 B1 | 9/2002 | Ozzie et al. | |
| 6,611,872 B1 | 8/2003 | McCanne | |
| 6,657,116 B1 | 12/2003 | Gunnerson | |

(Continued)

OTHER PUBLICATIONS

Abdul-Rahman et al., "A Distributed Trust Model," 1997 New Security Paradigms Workshop, ACM 1998, (pp. 48-59).

(Continued)

*Primary Examiner*—Kenny S Lin
*Assistant Examiner*—Angela Widhalm
(74) *Attorney, Agent, or Firm*—Robert C. Kowert; Meyertons, Hood, Kivlin, Kowert & Goetzel, P.C.

(57) ABSTRACT

In a system and method for the distribution of identities and reputation on a network, identity and reputation information may be distributed among nodes on a network (e.g. nodes on a peer-to-peer network). Embodiments may allow nodes on the network to evaluate other nodes' reputation using the distributed reputation information. Embodiments may allow nodes to iteratively increase confidence in a determined reputation of a node by determining the reputation of nodes that provide reputation information corresponding to the node. Embodiments may allow nodes to adjust a reputation of other nodes using results of transactions and prior reputations. Determined or adjusted reputation information and/or transaction information may be distributed among the nodes on the network. In one embodiment, transaction information may be divided into segments and the segments may be distributed among the nodes on the network.

71 Claims, 15 Drawing Sheets

U.S. PATENT DOCUMENTS

| | | |
|---|---|---|
| 6,658,540 B1 | 12/2003 | Sicola et al. |
| 6,671,746 B1 | 12/2003 | Northrup |
| 6,681,282 B1 | 1/2004 | Golden et al. |
| 6,697,944 B1 | 2/2004 | Jones et al. |
| 6,854,016 B1 | 2/2005 | Kraenzel et al. |
| 6,892,230 B1 | 5/2005 | Gu et al. |
| 6,963,867 B2 | 11/2005 | Ford et al. |
| 2002/0027567 A1 | 3/2002 | Niamir |
| 2002/0044549 A1* | 4/2002 | Johansson et al. ........... 370/386 |
| 2002/0052885 A1 | 5/2002 | Levy |
| 2002/0062375 A1 | 5/2002 | Teodosiu et al. |
| 2002/0073075 A1* | 6/2002 | Dutta et al. .................... 707/3 |
| 2002/0073204 A1 | 6/2002 | Dutta et al. |
| 2002/0099787 A1* | 7/2002 | Bonner et al. ............... 709/216 |
| 2002/0138471 A1 | 9/2002 | Dutta et al. |
| 2002/0138576 A1 | 9/2002 | Schleicher et al. |
| 2002/0152262 A1* | 10/2002 | Arkin et al. ................ 709/202 |
| 2002/0165815 A1* | 11/2002 | Vincent ....................... 705/37 |
| 2002/0184311 A1 | 12/2002 | Traversat et al. |
| 2003/0009570 A1 | 1/2003 | Moskowitz et al. |
| 2003/0055894 A1 | 3/2003 | Yeager et al. |
| 2003/0055898 A1* | 3/2003 | Yeager et al. ............... 709/205 |
| 2003/0056093 A1* | 3/2003 | Huitema et al. ............. 713/156 |
| 2003/0061287 A1 | 3/2003 | Yu et al. |
| 2003/0115251 A1 | 6/2003 | Fredrickson et al. |
| 2003/0163697 A1 | 8/2003 | Pabla et al. |
| 2003/0163729 A1* | 8/2003 | Buchegger .................. 713/201 |
| 2003/0217140 A1* | 11/2003 | Burbeck et al. ............. 709/224 |
| 2004/0006586 A1 | 1/2004 | Melchione et al. |
| 2004/0088347 A1 | 5/2004 | Yeager et al. |
| 2004/0088348 A1 | 5/2004 | Yeager et al. |
| 2004/0088369 A1 | 5/2004 | Yeager et al. |
| 2004/0088646 A1 | 5/2004 | Yeager et al. |
| 2004/0133640 A1 | 7/2004 | Yeager |
| 2005/0086300 A1 | 4/2005 | Yeager et al. |
| 2005/0251539 A1 | 11/2005 | Parekh et al. |

OTHER PUBLICATIONS

Zacharia et al., "Trust Management Through Reputation Mechanisms," Applied Artificial Intelligence, 2000, 14:881-907.

"Frequently Asked Questions about PGPi," http://web.archive.org/web/20020207220715/http://stale.schumacher.no/email.shtml, Mar. 2, 2001, (9 pages).

Bill Yeager, "Self Constructing P2P Networks Using the Project JXTA P2P Protocols," http://netseminar.stanford.edu/sessions/2002-03-14.html, Mar. 14, 2002, (2 pages).

Cameron Ross Dunne, "Using Mobile Agents for Network Resource Discovery in Peer-to-Peer Networks," http://www.acm.org/sigs/sigecom/exchanges/volume_2_(01)/2.3-index.html, 2001, (11 pages).

Fung et al., "Part-Time MSC Project 1 Mid-Term Review report," Peer-to-Peer Networks & Mobile Agents, Oct. 31, 2001, (12 pages).

Alan Beecraft, "Peer-to-Peer: From JMS to Project JXTA Part 1 : Shall we Chat?," http://java.sun.com/developer/technical/articles/peer/, Nov. 2001, 5 pages.

"LICQ Info," http://web.archive.org/web/20010808110229/www.licq.org/info.html, Aug. 8, 2001, 4 pages.

"Project JXTA: An Open, Innovative Collaboration," Sun Microsystems, Inc., Apr. 25, 2001, (7 pages).

"JXTA v1.0 Protocols Specification," Sun Microsystems, Inc., 2002, (86 pages).

Sniffen, "Trust Economies in the Free Haven Project," May 22, 2000, pp. 1-38.

Oram, "Peer-to-Peer: Harnessing the Benefits of a Disruptive Technology," Mar. 2001, O'Reilly & Associates, First Edition, Chapters 16 and 18.

Oshima, et al., "Aglets Specification 1.1 Draft," Sun Microsystems, Sep. 8, 1998, 40 pages.

Traversat, et al., "Project JXTA Virtual Network," Sun Microsystems, Inc., Feb. 5, 2002, 10 pages.

Lange, et al., "Mobile Agents with Java: The Aglet API," World Wide Web, vol. 1, Issue 3, 1998, pp. 111-121.

* cited by examiner

```
┌─────────────────────────────────────────────┐
│ Perform a transaction including reputation determination │
│        for the nodes involved in the transaction         │
│                         430                              │
└─────────────────────────────────────────────┘
                        │
                        ▼
┌─────────────────────────────────────────────┐
│         Determine a result of the transaction            │
│                         432                              │
└─────────────────────────────────────────────┘
                        │
                        ▼
┌─────────────────────────────────────────────┐
│  Modify the reputation of the nodes involved in the      │
│  transaction using the result and the reputation of the  │
│         nodes prior to the transaction                   │
│                         434                              │
└─────────────────────────────────────────────┘
                        │
                        ▼
┌─────────────────────────────────────────────┐
│  Distribute the adjusted reputations to one or more other│
│                         nodes                            │
│                         436                              │
└─────────────────────────────────────────────┘
```

FIG. 7

DISTRIBUTED IDENTITIES

PRIORITY INFORMATION

This application claims benefit of priority to U.S. Provisional Application Ser. No. 60/366,839 titled "Distributed Identities" filed on Mar. 22, 2002.

BACKGROUND OF THE INVENTION

1. Field of the Invention

This invention relates to computer networks, and more particularly to reputations of entities in a network.

2. Description of the Related Art

Historically, an entity in a networked computing environment may have multiple, unlinked identities that exist in centralized, disconnected repositories. Further, entity's reputations are traditionally centralized in disconnected repositories. For example, an Internet auction site or a credit-reporting agency may compute reputation scores based on information that is fed into a centralized system. This centralization may lead to a proliferation of identities, centralizes power and control in the hands of those controlling the identities, and may preclude more interesting trust relationships from forming.

An identity may be defined as a binding of attributes to a name. For example, a credit report binds a person's name to a social security number and a credit history. As another example, a Yahoo! account binds a name to a profile, an email account, and instant messaging endpoint. As yet another example, an eBay identity binds a pseudonym to a trading history and a reputation. As still yet another example, an X.509 certificate binds attributes such as a public key and an email address to a "distinguished name." An identity may be used to consuming the attributes and information corresponding to the identity. For example, an entity may read web-based email that is associated with a pseudonym.

Establishing the identity of an entity may include several components. One component may be authentication, proving who an entity claims it is, for example to access a resource such as a peer-to-peer application or service. An authentication server may perform authentication of an entity by receiving and verifying evidence of credentials of the entity. Credentials may vary, and may include such credentials as secret handshakes, passwords, and proof of knowing a private key via public-key cryptography techniques.

Authentication may be distributed. Distributed authentication may be used to implement a "single sign-on" solution. In distributed authentication, a resource may not have to perform the authentication of an entity itself. Rather, the resource may rely on a trusted authentication service. For example, resource Y may trust a service X to perform authentication. An entity may authenticate itself to X. X may inform Y that the entity is authenticated (directly or indirectly). Thus, the entity may be authenticated to Y.

Technically, distributed authentication may be relatively easy to implement. Techniques for implementing distributed authentication are well known. However, the techniques for implementing distributed authentication are not standardized and security concerns exist for browser-based authentication services. Politically, distributed authentication is not so easy to implement. Distributed authentication requires a "trust network" of authentication services and resources that rely on the services. Presently, there is no economic impetus for such a trust network.

Another component of establishing the identity of an entity may be authorization of the entity to access a resource based on who the entity is and one or more pre-established rules. Authorization may be viewed as a step after authentication. Similar to authentication, authorization may be distributed; a relying resource may decide to trust an authorization service to perform authorization. Distributed authorization may have similar technical and political issues as distributed authentication.

Yet another component of establishing the identity of an entity may be trusted attributes. It may be necessary or desirable to establish trustworthiness of attributes associated with an entity's name. For example, one entity may tell a second entity that a third entity's public key is such-and-such. How does the second entity trust that assertion? One approach is by using certificates, for examples an X.509 certificate signed by a trusted Certificate Authority. Trust models may include, but are not limited to, Centralized, Hierarchical, and Transitive (e.g. "web of trust") trust models. Note that trust is not necessarily binary; because one entity establishes trust in a second entity does not necessarily imply that the second entity trusts the first entity.

Still yet another component of establishing the identity of an entity may be reputation: how trustworthy is the entity in some particular context? Trust relationships for identities may be established. For example, a bank may evaluate the credit report associated with a personal physical identity. As another example, someone using eBay may make purchasing decisions based on the reputation of a pseudonym identity.

On a network of decentralized nodes, for example in a peer-to-peer networking environment, a single node may not be trusted to maintain reputation information about all the nodes. Moreover, no one node may be powerful enough to accept, verify, and store information regarding all the transactions that are taking place—information that may influence a node's reputation.

Peer-to-Peer Computing Environment

Peer-to-peer (P2P) computing, embodied by applications like Napster, Gnutella, and Freenet, has offered a compelling and intuitive way for Internet users to find and share resources directly with each other, often without requiring a central authority or server. The term peer-to-peer networking or computing (often referred to as P2P) may be applied to a wide range of technologies that greatly increase the utilization of information, bandwidth, and computing resources in the Internet. Frequently, these P2P technologies adopt a network-based computing style that neither excludes nor inherently depends on centralized control points. Apart from improving the performance of information discovery, content delivery, and information processing, such a style also can enhance the overall reliability and fault-tolerance of computing systems. FIG. 1A illustrates two peer devices 104A and 104B that are currently connected. Either of the two peer devices 104 may serve as a client of or a server to the other device. FIG. 1B illustrates several peer devices 104 connected over the network 106 in a peer group. In the peer group, any of the peer devices 104 may serve as a client of or a server to any of the other devices.

SUMMARY OF THE INVENTION

Embodiments of a system and method for the distribution of identities and reputation on a network are described. Embodiments may distribute and maintain identity and reputation information among nodes on a decentralized network (e.g. a peer-to-peer network). Embodiments may allow nodes on the network to evaluate other nodes' reputation. Embodiments may allow nodes to iteratively increase confidence in a particular evaluation of a reputation.

Two nodes may desire to perform a transaction, and the reputation of a first node may need to be established to determine if a second node can trust the first node in the transaction. The second node may request reputation information for the first node on the network. The second node may receive one or more responses to the request from other nodes that have reputation information on the first node. Each response may include particular reputation information for the first node. The second node may use the received reputation information to determine a reputation of the first node. If the determined reputation is at or above a threshold, then the second node may determine that the first node may be trusted and the transaction may be performed. If the determined reputation is below the predetermined threshold, then the second node may determine that the first node may not be trusted and may decide to not perform the transaction. Before entering the transaction, the first node may also perform a similar determination of a reputation for the second node.

If both nodes are satisfied in the determined reputation of the other node, then the transaction may be performed. In one embodiment, each node may then adjust the reputation of the other node using results of the transaction (e.g. a level of satisfaction or other outcome of the transaction) and a reputation of the other node prior to the transaction. Reputation information and/or transaction information may then be distributed among other nodes on the network. Note that, in distributing the reputation information and/or transaction information among the other nodes, the information may be distributed to a portion or all of the other nodes on the network.

In one embodiment, when adjusting a reputation for a node on a network, a node may request reputation information for nodes that provided reputation information for the other node. The node may receive one or more responses to the request each including reputation information for one of the nodes that provided reputation information for the other node. The node may adjust the reputation of the other node from the received reputation information for the other peer nodes. In adjusting the reputation, the node may, for example, raise the reputation of the other node if the reputation of at least one of the other peer nodes is sufficient (e.g. above a threshold) to determine that the node in question may be trusted to provide valid reputation information for the other peer node. Note that the other peer node may also perform a similar adjustment of a determined reputation of the node before performing a transaction. In one embodiment, adjusting the reputation may be iteratively performed, with each iteration using reputation information corresponding to the providing nodes in the previous iteration, until a threshold for iteration is reached.

In one embodiment, one or both nodes may adjust reputation information corresponding to the other node after a transaction, for example using a reputation function. The particular reputation function used may vary depending upon the particular application or context. A transaction may be performed, which may include reputation determination for the nodes involved in the transaction. The transaction may generate a result. The reputation of one or both of the nodes involved in the transaction may be modified using the result and the reputation of the node(s) prior to the transaction. Generally stated, the reputation of two nodes may change as a function of the result of their interaction (e.g. a transaction) and may be weighted by each node's reputation prior to the transaction.

After adjusting the reputation of nodes after a transaction, the adjusted reputation information may be distributed to one or more other nodes on the network. In one embodiment, not all nodes on a network will always be online. To insure that reputation information is available as needed, in one embodiment the reputation information may be replicated across nodes on a network. Upon completing a transaction, both participating nodes may provide to other nodes that they trust some information that identifies the transaction and its result. Other nodes may then use the information provided by the nodes to determine a level of trust in the nodes prior to or during a transaction and/or to verify transaction results after the transaction.

In one embodiment, transaction results may not be entrusted to any single node. For example, a node may not wish other nodes to know exactly what transpired in a particular transaction. To handle situations where a transaction's participating nodes may not be online when another node wishes to access the transaction, transaction information may be divided into pieces or segments and distributed among a plurality of nodes. The transaction information may then be reconstructed from the pieces or segments by another node as needed.

BRIEF DESCRIPTION OF THE DRAWINGS

FIG. 7 illustrates adjusting reputation information after a transaction according to one embodiment;

Figure 1A:
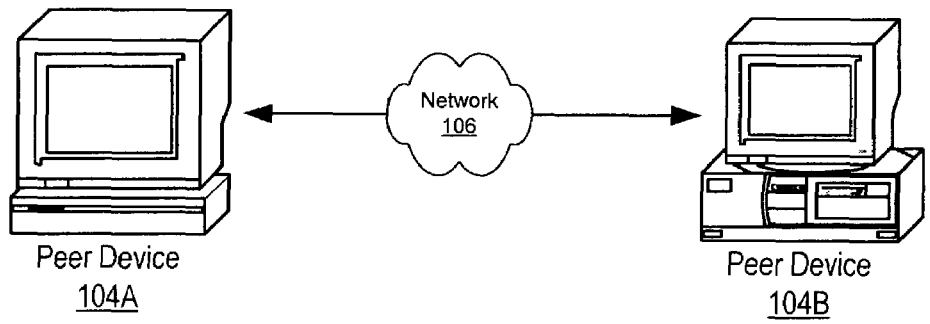
FIG. 1A illustrates a prior art example of two devices that are currently connected as peers.
Figure 1B:
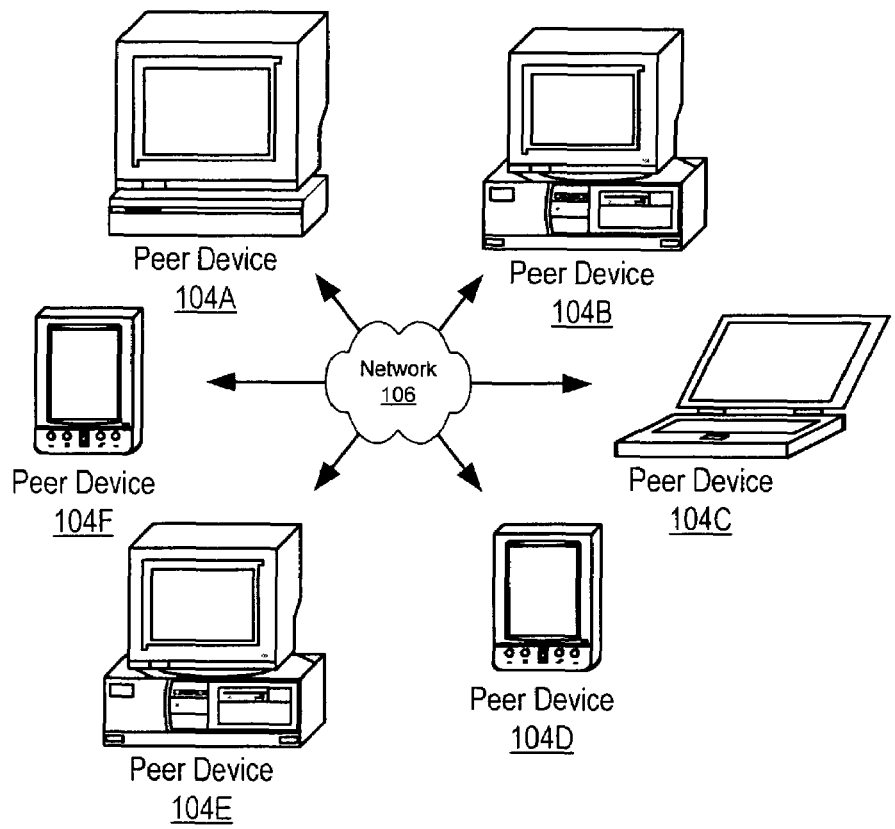
FIG. 1B illustrates a prior art example of several peer devices connected over the network in a peer group.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS OF THE INVENTION

Embodiments of a system and method for the distribution of identities and reputation on a network are described. Embodiments may distribute and maintain identity and reputation information among nodes on a decentralized network (e.g. a peer-to-peer network). Discovering a node's transaction history N transactions long and verifying the results and reputations of each node involved may require up to $2^N$ network queries, depending on the number of transactions engaged in by the nodes in the given node's history. Embodiments may allow nodes on the network to evaluate other nodes' reputation. Embodiments may allow nodes to iteratively increase confidence in a particular evaluation of a reputation.

Decisions (e.g. whether two nodes are to perform a given transaction) may be made based on perceived or estimated reputations of people, companies, etc. Reputation may be viewed as a composite score that may be used by an entity (e.g. node on a network) to evaluate another entity's fitness for some purpose. The composite score may be based on a set of assertions. Varying levels of trust may be placed in each individual assertion. Reputation calculations may be context-dependent. For example, reputation calculations may vary between transaction systems such as eBay and content sharing systems such as groups of peers in a peer-to-peer environment.

Using embodiments, nodes in network environments such as peer-to-peer environments may not have to rely on centralized identity services. Decentralizing identity and reputation information and reputation determination may offer a number of advantages over centralized architectures. For example, the load of identity and reputation determination on a network may be spread from a small set of servers to a larger set of nodes. This may allow nodes to join the network in an ad-hoc fashion and to provide identity and reputation resources. As another example, decentralization may create a "network effect" such that identity and reputation information may be distributed, exchanged, aggregated, and analyzed in ways not before possible.

Figure 2:
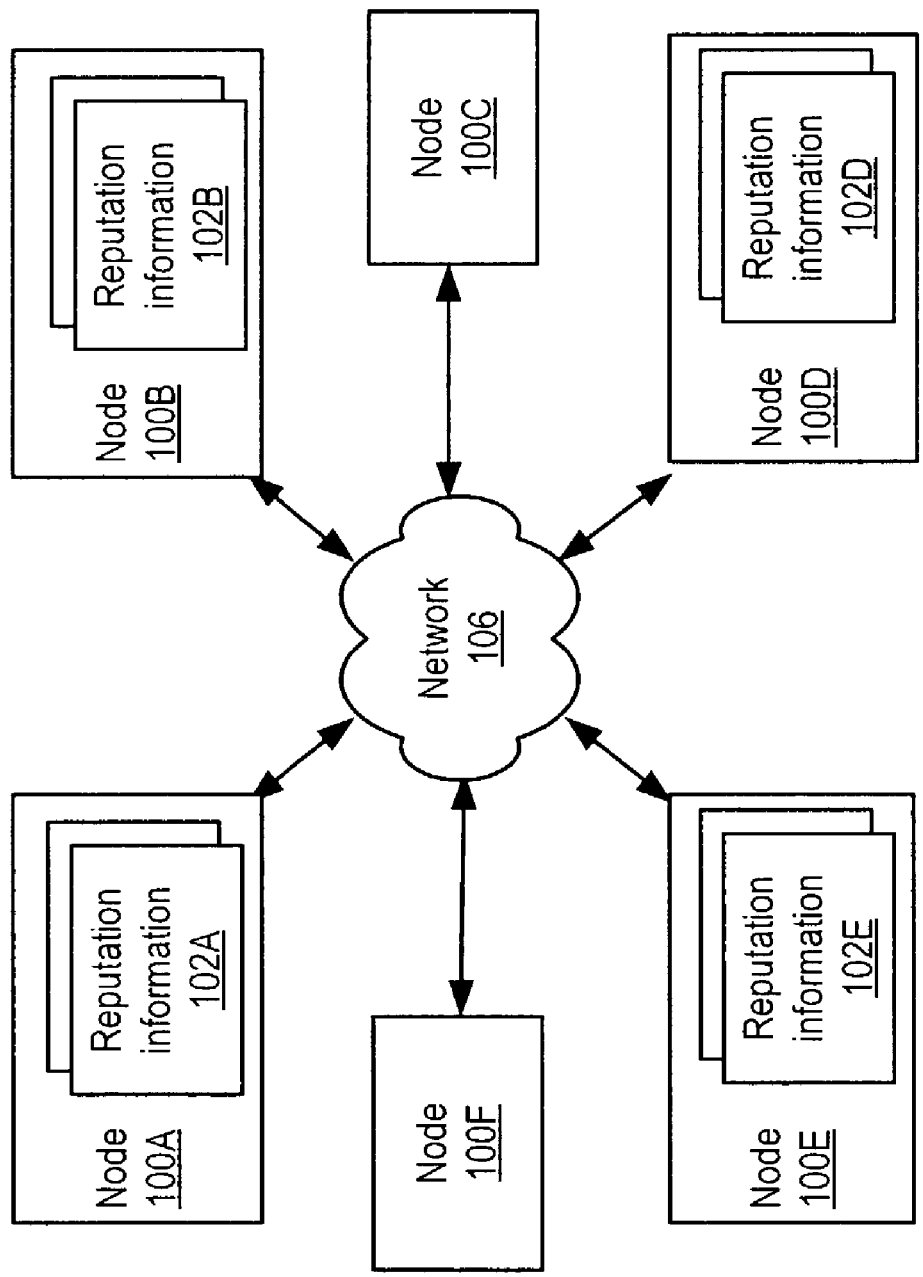
FIG. 2 illustrates reputation information distributed among a plurality of nodes according to one embodiment.

As illustrated in FIG. 2, reputation information 102 may be distributed among at least a subset of nodes 100 on a network 106. In one embodiment, not all nodes 100 may store reputation information. In one embodiment, reputation information 102 for each node 100 may be stored on at least one other node 100. In one embodiment, before, during or after a transaction between two nodes 100A and 100B, an evaluation may be performed that may include a node 100A determining an approximation of a node 100B's reputation by requesting and receiving reputation information 102 from one or more other nodes 100 on network 106. This reputation information 102 may indicate the providing nodes' approximation of the reputation of node 100B determined for previous transactions between the providing node and node 100B. In one embodiment, the reputation information 102 may have been received from another node 100 and stored by the responding node 100. Reputation information 102 corresponding to the one or more other nodes 100 may then be requested and received (from yet other nodes) and a calculation performed using the new reputation information 102 to further refine the approximation of node 100B's reputation.

In one embodiment, the process of refining the reputation may iterate, with each iteration using reputation information 102 corresponding to the previous iteration's providing nodes 100 to further refine node 100A's reputation approximation for node 100B. In one embodiment, iteration may continue until a confidence threshold for the reputation (which may be referred to as a reputation threshold) is reached. In one embodiment, iteration may continue until a limit or threshold (e.g. high or low) for the reputation approximation is reached. In one embodiment, iteration may continue until a time limit is reached. In one embodiment, iteration may continue until a certain number of iterations are performed. Some embodiments may use a combination of one or more of these methods for determining when to stop the iteration. Note that node 100A's approximation of the reputation of node 100B may be increased, not changed, or even decreased by such refining.

Note also that node 100B may perform a similar evaluation of node 100A's reputation, including an initial approximation and further refining, before, during or after the transaction. Each of two nodes wishing to participate in a transaction may first determine a reputation for the other node using reputation information distributed on a network, rather than at a centralized location, before committing to the transaction. Alternatively, each of two nodes may determine a reputation for the other node using reputation information distributed on a network, rather than at a centralized location, to verify results of a transaction.

Nodes 100 may be implemented on any of a variety of devices, including, but not limited to, simple light switches, PDAs, cell phones, pagers, laptop and notebook computers, smart appliances, personal computers, workstations, complex, highly-available servers, mainframe computers and even supercomputers. The network 106 may be any of a variety of networks including, but not limited to, the Internet, corporate intranets, dynamic proximity networks, home networking environments, LANs and WANs, among others.

In one embodiment, nodes 100 as illustrated in FIG. 2 may be peer nodes participating in a peer-to-peer networking environment. An exemplary peer-to-peer platform in which embodiments as described herein may be implemented is described later in this document. It is noted that embodiments may also be implemented in other peer-to-peer environments implemented in accordance with other peer-to-peer mechanisms. It is further noted that, although embodiments as described herein are generally described in reference to peer-to-peer networking environments, embodiments may also be implemented in other networking architectures and environments, for example in client-server systems.

In a network computing environment, reputation may be used to evaluate an entity (e.g. a node in a peer-to-peer networking environment) when the entity is seeking to access a resource, including but not limited to another node or content of another node (e.g. files, services, applications, etc.). Peer-to-peer technology makes possible large, decentralized networks of information. This information may include facts that may be discovered and used for reputation calculations. Countermeasures to fraudulent facts in a peer-to-peer environment may be critical.

In one embodiment, a peer node may broadcast a network request, asking other nodes to for information about another peer node's reputation as of a certain time. Peer nodes that have interacted with the other peer node may respond with information (e.g. a reputation of the other peer node and time of the interaction that established the reputation). However, these responses themselves may not be trusted.

The peer node may further request reputation information for one or more of the responding peer nodes to determine a level of trust of the responding peer nodes. For example, if a peer node Y replies that it interacted with the other peer node and claims the other peer node's reputation before and after the interaction were such and such, the claim may be verified by asking the network for Y's reputation before the interaction with the other peer node. This process may be repeated multiple times, with each iteration potentially increasing (or potentially decreasing) the reputation or level of trust in the other peer node, for example until a certain threshold of reputation or level of trust is established in the other node, or conversely until it is determined that the other node's reputation is not to be trusted. In some embodiments, iteration may continue until a time limit is reached. In some embodiments, iteration may continue until a certain number of iterations have been completed. Some embodiments may combine two or more of reputation threshold, time limit and iteration count to limit iterations. Other embodiments may use other methods to limit iteration, such as limits on resource usage.

Repeating the verification of reputation in such a manner may thus be used to reduce the level of risk involved in transactions with the other peer node. By verifying the reputation of the responding peer nodes providing the initial reputation information for the other node, the chance of a peer node providing false information may be reduced, for example by 50% at each repetition. The level of risk may be reduced further by verifying the reputation of the other peer node prior to interactions with the responding peer nodes. For example, by verifying the reputation of the other peer node prior to the interaction with Y as described above, the level of risk may be further reduced, e.g. by 25%.

Figure 3:
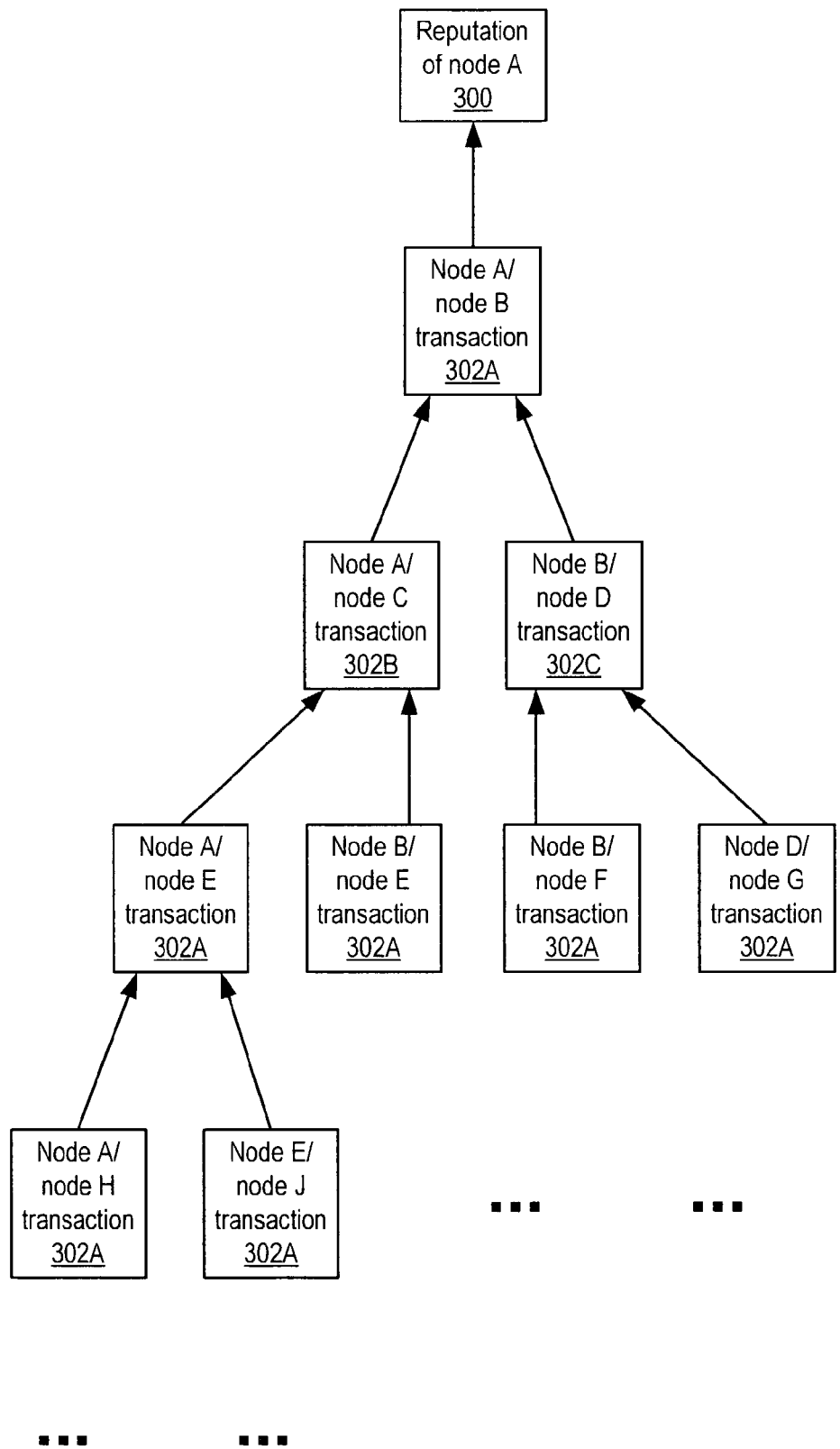
FIG. 3 illustrates an iterative process of refining a node's reputation according to one embodiment.

FIG. 3 illustrates an iterative process of refining a node's reputation according to one embodiment. When determining a node A's reputation 300, discovering the node A's transaction history N transactions 302 long and verifying the results and reputations of each node involved may require up to $2^N$ network queries, depending on the number of transactions engaged in by the nodes in the given node's history.

Repeating the verification may be expensive in terms of network resources. For example, by verifying the reputation of a peer node providing the reputation information for the other peer node, the network traffic may be doubled. By verifying the rating of the other peer node prior to the interaction with the responding peer node, the network traffic may be doubled again. Thus, there may be a trade-off in the reliability of the reputation verification and the time/network resources consumed by the verification. Thus, in one embodiment, a user interface may be provided to allow a threshold or thresholds to be established for the verification process to control the trade-off between the reliability of the reputation verification and the consumption of resources including time and network resources.

Figure 4:
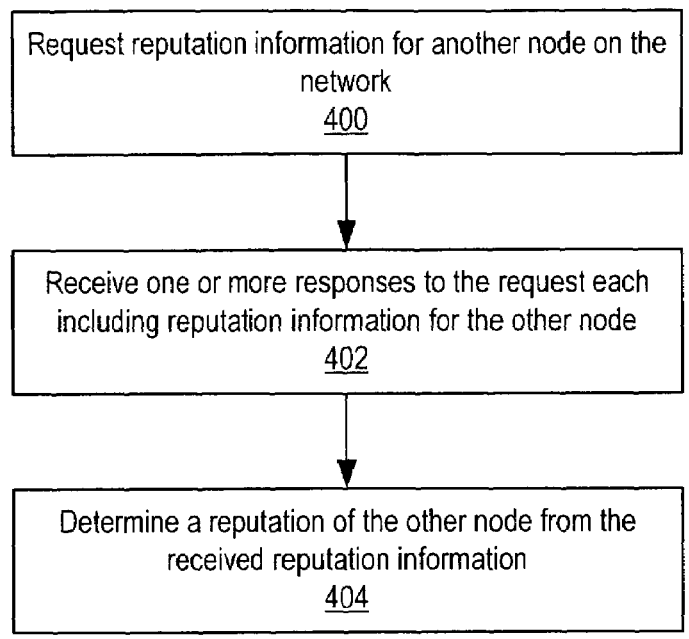
FIG. 4 is a flowchart illustrating a method of determining a reputation for a node on a network according to one embodiment.

FIG. 4 is a flowchart illustrating a method of determining a reputation for a node on a network according to one embodiment. For example, two nodes may desire to perform a transaction, and the reputation of a first node may need to be established to determine if a second node can trust the first node in the transaction. As indicated at 400, the second node may request reputation information for the first node on the network. As indicated at 402, the second node may receive one or more responses to the request from other nodes that have reputation information on the first node (e.g. that have had previous transactions with the first node or that have received reputation information corresponding to the first node from other nodes). Each response may include particular reputation information for the first node, and the reputation information in two or more of the responses may differ. As indicated at 402, the second node may use the received reputation information to determine a reputation of the first node. If the determined reputation is at or above a predetermined threshold, then the second node may determine that the first node may be trusted and the transaction may be performed. If the determined reputation is below the predetermined threshold, then the second node may determine that the first node may not be trusted and may decide to not perform the transaction. Note that, before entering the transaction, the first node may also perform a similar determination of a reputation for the second node. Note also that determining a reputation may actually determine an approximation of the reputation at the time of the request for reputation information.

If both nodes are satisfied in the determined reputation of the other node, then the transaction may be performed. In one embodiment, each node may then adjust the reputation of the other node using results of the transaction (e.g. a level of satisfaction or other outcome of the transaction) and a reputation of the other node prior to the transaction. Reputation information and/or transaction information may then be distributed among other nodes on the network. Note that, in distributing the reputation information and/or transaction information among the other nodes, the information may be distributed to a portion or all of the other nodes on the network.

Figure 5:
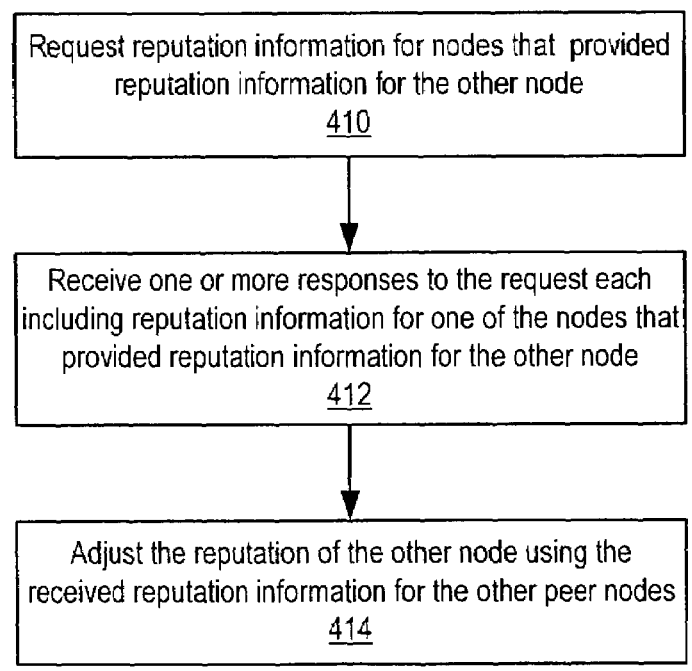
FIG. 5 is a flowchart illustrating a method of adjusting a reputation for a node on a network according to one embodiment.

FIG. 5 is a flowchart illustrating a method of adjusting a reputation for a node on a network according to one embodiment. As indicated at 410, the node may request reputation information for nodes that provided reputation information for the other node, for example as indicated at 402 of FIG. 4. As indicated at 412, the node may receive one or more responses to the request each including reputation information for one of the nodes that provided reputation information for the other node. As indicated at 414, the node may adjust the reputation of the other node from the received reputation information for the other peer nodes. In adjusting the reputation, the node may, for example, raise the reputation of the other node if the reputation of at least one of the other peer nodes is sufficient (e.g. above a threshold) to determine that the node in question may be trusted to provide valid reputation information for the other peer node. Note that the other peer node may also perform a similar adjustment of a determined reputation of the node before performing a transaction. In one embodiment, adjusting the reputation may be iteratively performed, with each iteration using reputation information corresponding to the providing nodes in the previous iteration, until a threshold for iteration is reached.

Figure 6:
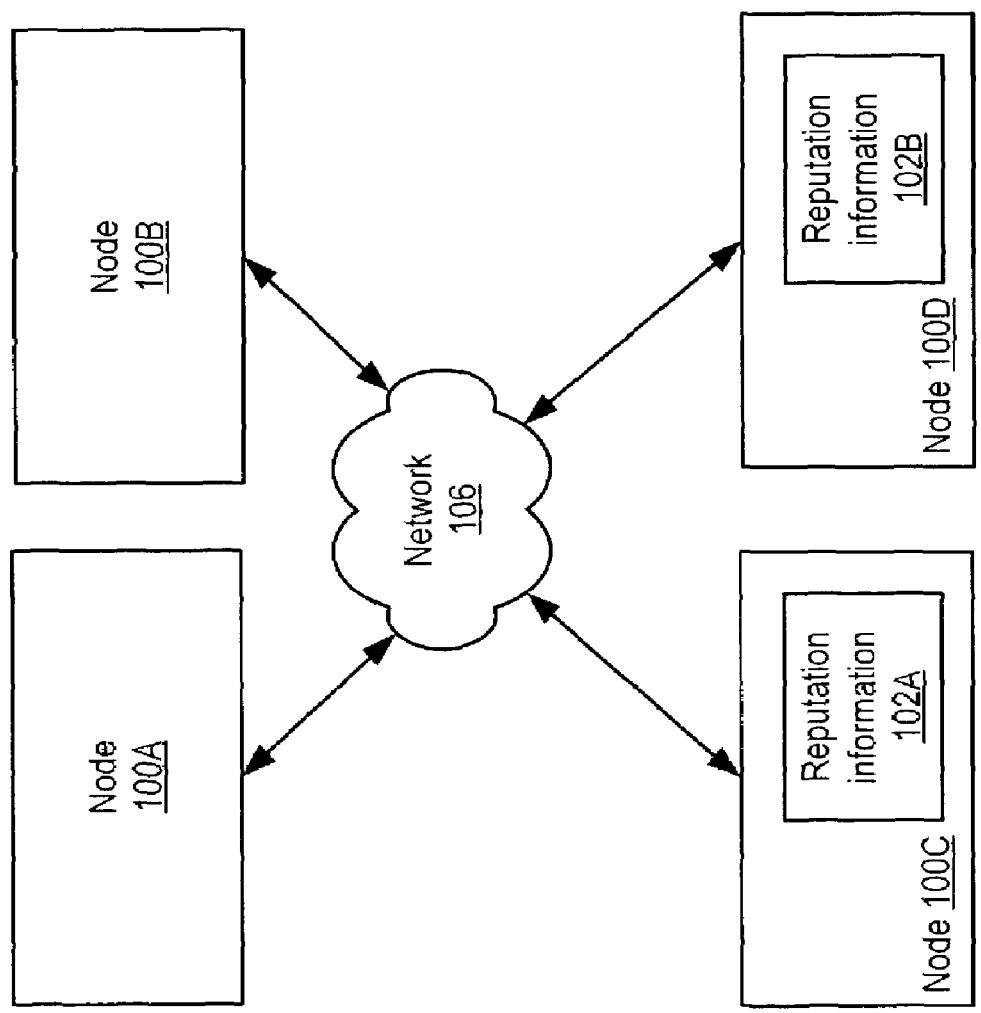
FIG. 6 illustrates a node on a network determining an approximation of another node's reputation according to one embodiment.

FIG. 6 illustrates a node on a network determining an approximation of another node's reputation according to one embodiment. If node 100A wishes to determine the reputation of node 100B, for example to determine whether to perform a transaction with node 100B or to verify results of a transaction between node 100A and node 100B, node 100A may request reputation information corresponding to node 100B from one or more other nodes 100 on the network 106.

The request may indicate, for example, the node for which the request is seeking information and a time which the reputation corresponds to, and may also include further information. If node 100C has reputation information 102A corresponding to node 100B, node 100C may respond by sending the information 102A to node 100B. This response may indicate, for example, the node for which the reputation information was requested, reputation information for the indicated node, and a time to which the reputation corresponds, and may also include further information. In one embodiment, if a node 100 does not have reputation information corresponding to the requested node 100B, the node may forward the request to one or more other nodes 100.

Upon receiving reputation information 102A corresponding to node 100B, node A may further adjust its confidence in node 100C's reputation evaluation of node 100B. In one embodiment, node 100A may request nodes 100 on the network (e.g. node 100D) for general reputation information corresponding to node 100C. Alternatively, node 100A may request nodes on the network (e.g. node 100D) for more specific information, for example the result of node 100C's transaction with node 100B and for reputation information corresponding to node 100C prior to the transaction. Note that node 100B may similarly determine an approximation of node 100A's reputation prior to or during the transaction.

As illustrated in FIG. 7, in one embodiment, one or both nodes may adjust reputation information corresponding to the other node after a transaction, for example using a reputation function. The particular reputation function used may vary depending upon the particular application or context. As indicated at 430, a transaction may be performed, which may include reputation determination for the nodes involved in the transaction. As indicated at 432, the transaction may generate a result. As indicated at 434, the reputation of one or both of the nodes involved in the transaction may be modified using the result and the reputation of the node(s) prior to the transaction.

Generally stated, the reputation of two nodes may change as a function of the result of their interaction (e.g. a transaction) and may be weighted by each node's reputation prior to the transaction:

Reputation($Xr(t), Yr(t)$,result)=($Xr(t'), Yr(t')$)

where $Xr(t)$, $Xr(t')$, $Yr(t)$, and $Yr(t')$, are node X and node Y's reputation at time t and t', respectively. result is the result of the transaction, and may vary depending upon the particular application. For example, result may be a satisfaction rating based upon a node's experience with the other node during the transaction, i.e. how satisfied the node is with the performance of the other node during the transaction. As an example, two nodes may perform a transaction through a site such as eBay. Each of the two nodes may determine a reputation for the other node as described above in order to make the transaction. After the transaction, the two nodes' reputation may be adjusted as a function of the result (e.g. satisfaction) of the transaction and the nodes' prior reputation. As another example, result may be a measure of success a node has in a transaction with another node, e.g. whether or not the node won or lost against the other node in a completion or gaming situation. In this example, the reputation may be viewed as a rating of a skill level in the competitive situation, and the reputation function may be used to adjust the rating of the participants in accordance with the results of the particular transaction. In one embodiment, the difference ($Xr(t')-Xr(t)$) may be weighted according to $Yr(t)$ and is positive if result is positive (the reputation goes up), 0 if result is 0 (the reputation does not change), and negative otherwise (the reputation goes down). For the example illustrated in FIG. 6, the function may be stated as:

Reputation($100Br(t), 100Cr(t)$,result)=($100Br(t'), 100Cr(t')$)

In one embodiment, each node's reputation at an initial time (t=0) may be defined. Initially, nodes in a network may each be assigned an initial reputation (which may or may not all be the same), for example, and the reputations of a node may be adjusted after the node participates in a transaction. Nodes entering the network may be assigned an initial reputation. In one embodiment, a default reputation may be assigned. In another embodiment, an initial reputation may be calculated for the new node using information that one or more of the existing nodes may have on the new node. For example, if users of one or more existing nodes know the user of the new node, they may vouch for the reputation of the user of the new node and thus the new node may be given a higher initial reputation than a user of a new node which is unknown to the users of the existing nodes.

As indicated at 436, after adjusting the reputation of nodes after a transaction, the adjusted reputation information may be distributed to one or more other nodes on the network. In one embodiment, not all nodes on a network will always be online. To insure that reputation information is available as needed, in one embodiment the reputation information may be replicated across nodes on a network. Upon completing a transaction, both participating nodes may provide to other nodes that they trust some information that identifies the transaction and its result. Other nodes may then use the information provided by the nodes to determine a level of trust in the nodes prior to or during a transaction and/or to verify transaction results after the transaction.

Figure 8:
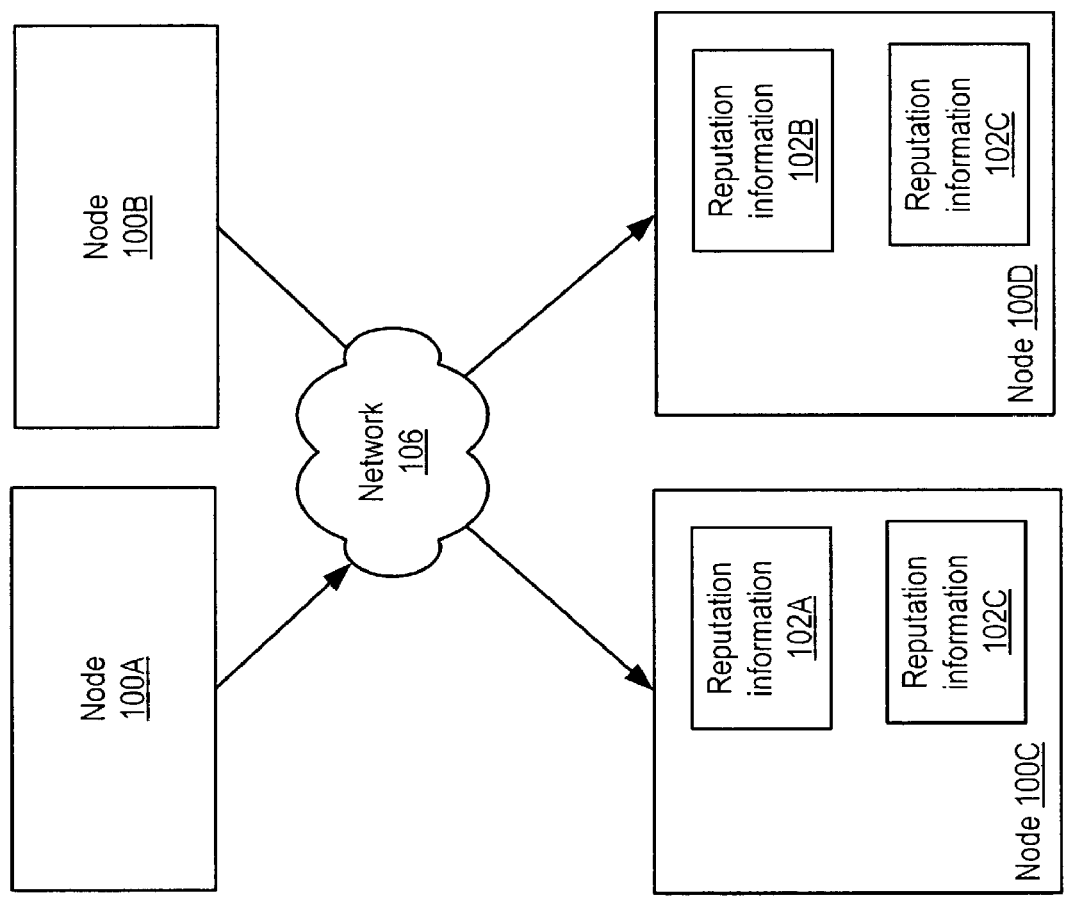
FIG. 8 illustrates distributing reputation information among nodes according to one embodiment.

For example, as illustrated in FIG. 8, after node 100A determines the reputation of node 100B, for example using a mechanism as illustrated in FIGS. 4 and 5, the two nodes may complete the transaction that generated node 100A's reputation determination for node 100B. Node 100A may then distribute reputation information 100C corresponding to the completed transaction with node 100B to nodes 100C and 100D and/or to one or more other nodes 100 on the network.

In one embodiment, transaction results may not be entrusted to any single node. For example, a node may not wish other nodes to know exactly what transpired in a particular transaction. The node may have completed a purchase transaction on eBay, for example, and may not wish details of the purchase transaction to be revealed. Transaction results may include any of various types of data, for example financial information, and may be in any of a variety of formats, for example a string or encrypted string.

Figure 10:
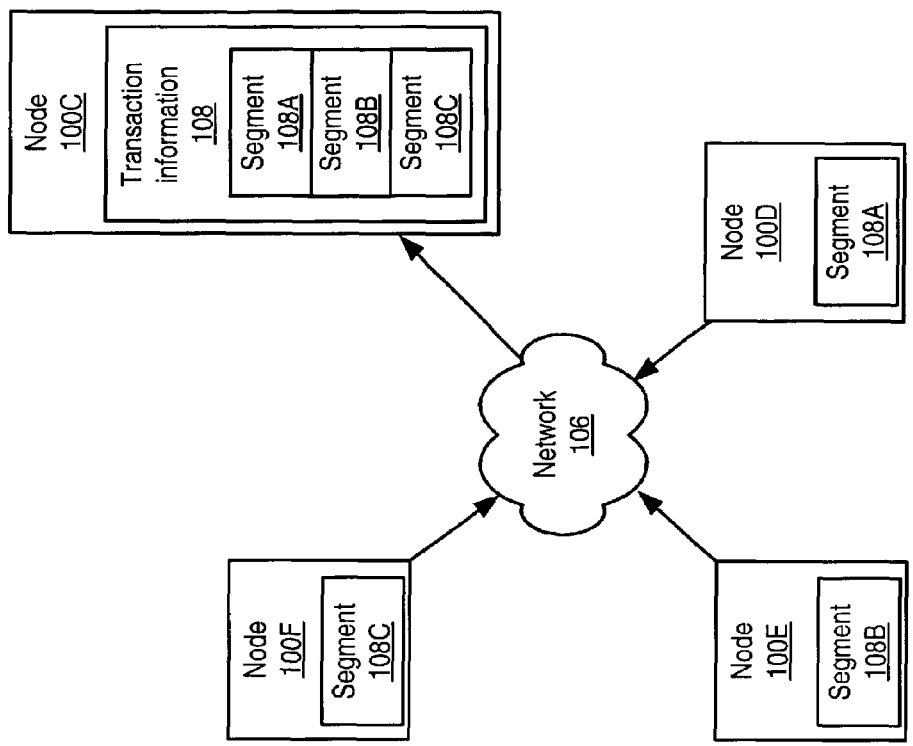
FIG. 10 illustrates reconstructing transaction information from distributed segments of the transaction information according to one embodiment.
Figure 9:
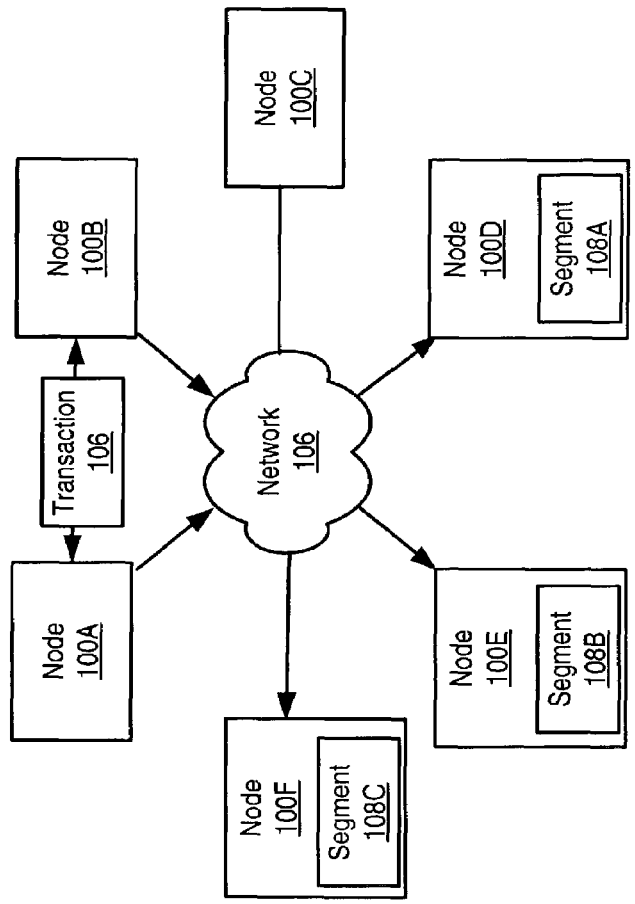
FIG. 9 illustrates segmenting and distributing the segments of transaction information among a plurality of nodes according to one embodiment.

In one embodiment as illustrated in FIG. 9, to handle situations where a transaction 106's participating nodes 100A and 100B may not be online when another node 100 wishes to access the transaction (e.g. to verify the transaction or to use the transaction information in determining a reputation for one of the nodes), transaction information 108 may be divided into N pieces or segments (in this example, segment 108A, 108B, and 108C) and distributed among M nodes (in this example, nodes 100D, 100E, and 100F respectively). As illustrated in FIG. 10, the transaction information 108 may then be reconstructed from the pieces or segments by another node 100, in this example node 100C, as needed. In one embodiment, to retrieve pieces or segments of information 108 from other nodes 100, a node 100 may provide a valid key obtained, for example, from one or both participating nodes 100 in a transaction 106 associated with transaction information 108.

In one embodiment, strong cryptography may be used to enable nodes that trust each other to exchange or vouch for information. Unless a node completely trusts another node, the fact that the other node signed something may not carry much weight. One embodiment may provide one or more distributed directories of Public Keys. Distributed directory algorithms such as Chord or Content-Addressable Networks may be used to store Public Keys when nodes are off-line and to reduce broadcast traffic.

Figure 11:
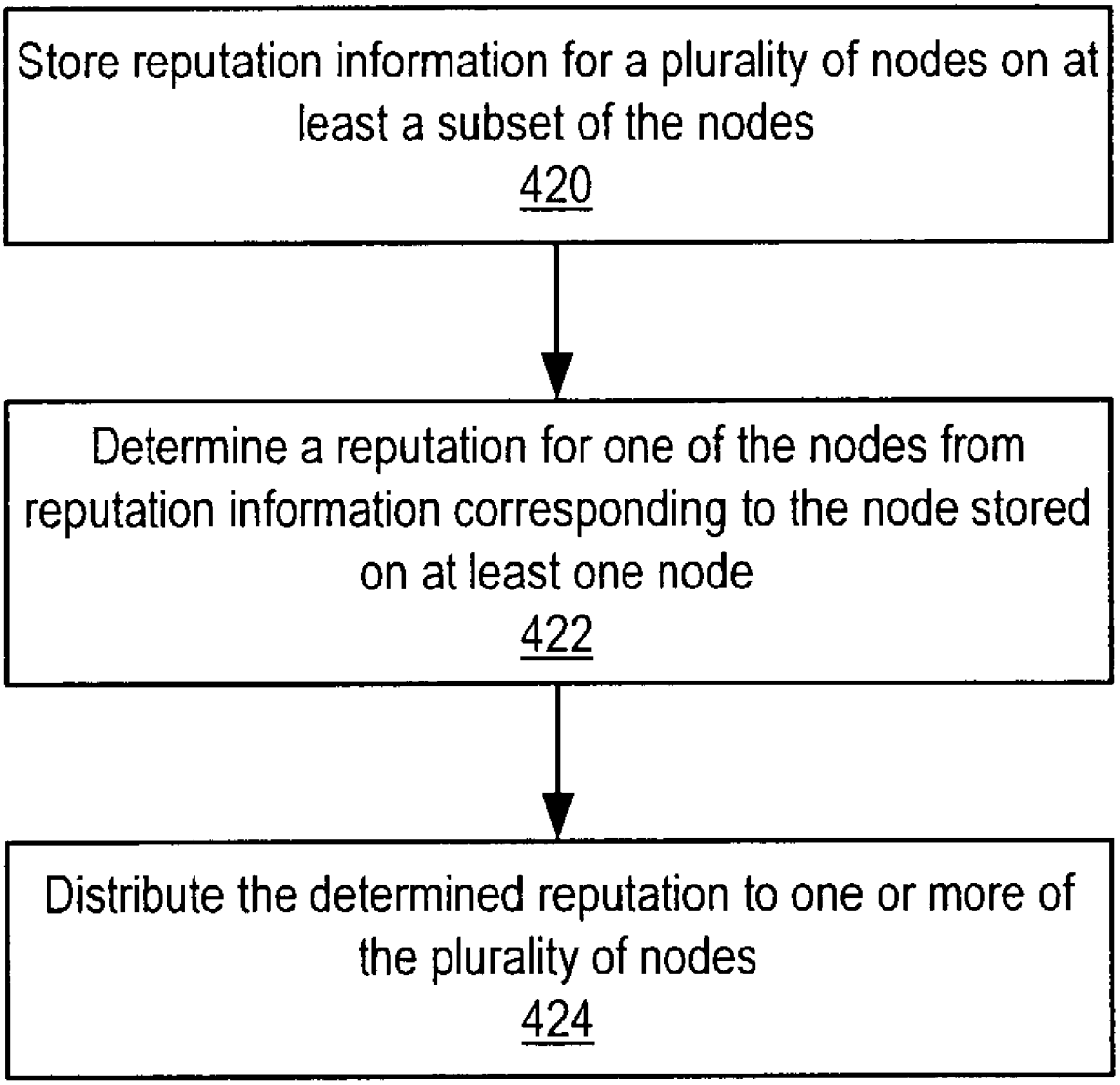
FIG. 11 is a flowchart illustrating a method of distributing and storing reputation information for nodes in a network according to one embodiment.

FIG. 11 is a flowchart illustrating a method of distributing and storing reputation information for nodes in a network according to one embodiment. As indicated at 420, reputation information for a plurality of nodes may be stored (distributed) on at least a subset of the plurality of nodes or even on other nodes not in the plurality of nodes. As indicated at 422, any one of the plurality of nodes may determine a reputation for one of the other nodes from reputation information corresponding to the other node stored on at least one node, for example using embodiments of the method as described in FIGS. 4 and 5. As indicated at 424, after determining the reputation, the node may distribute the determined reputation for the other node to one or more of the plurality of nodes. Any of the nodes may then use this distributed reputation information in determining a reputation for the other node.

Note that the flowcharts and methods as illustrated in the Figures and described herein, represent exemplary embodiments of methods. The methods may be implemented in software, hardware, or a combination thereof. The order of method may be changed, and various elements may be added, reordered, combined, omitted, modified, etc.

Peer-to-Peer Platform

The following is a description of an open network computing platform designed for peer-to-peer computing in which embodiments of the system and method for the distribution of identities and reputation on a network as described herein may be implemented.

The network computing platform may be referred to as a peer-to-peer platform. The peer-to-peer platform may be used to build a wide range of distributed services and applications in which every device is addressable as a peer, and where peers can bridge from one domain into another. The peer-to-peer platform may enable developers to focus on their own application development while easily creating distributed computing software that is flexible, interoperable, and available on any peer on the expanded Web. The peer-to-peer platform may enable software developers to deploy interoperable services and content, further spring-boarding the peer-to-peer revolution on the Internet. The peer-to-peer platform addresses the problems of prior art peer-to-peer systems by providing a generic and service-agnostic peer-to-peer platform that may be defined by a small number of protocols. Each protocol may be easy to implement and easy to be adopted into peer-to-peer services and applications. Thus, service offerings from one vendor may be used, perhaps transparently, by the user community of another vendor's system.

The peer-to-peer platform extends P2P computing to enable a wide range of distributed computing applications and overcome the limitations typically found in prior art P2P applications. The peer-to-peer platform is a network computing technology that provides a set of simple, small, and flexible mechanisms that can support P2P computing on any platform, anywhere, and at any time. The peer-to-peer platform generalizes P2P functionality and provides core technology that addresses the limitations of prior art P2P computing technologies.

The peer-to-peer platform is a modular platform that provides simple and essential building blocks for developing a wide range of distributed services and applications. The peer-to-peer platform specifies a set of protocols rather than an API. Thus, the peer-to-peer platform can be implemented in any language on any Operating System to provide solutions ranging from providing a simple protocol-based wrapper that enables a small device to join a network of peers to developing a fully integrated application that supports metering, monitoring, high-level security and communication across server-class systems.

In one embodiment, the peer-to-peer platform architecture may include, but is not limited to, protocols, advertisements, and core services. Network protocol bindings may be used to ensure interoperability with existing content transfer protocols, network transports, routers, and firewalls. The peer-to-peer platform may be used to combine network nodes (peers) into a simple and coherent peer-to-peer network computing platform. The platform may be directed at providing several benefits including, but not limited to, no single point of failure, asynchronous messaging, the ability for peers to adapt to their network environment, and moving content towards its consumers.

Figure 12:
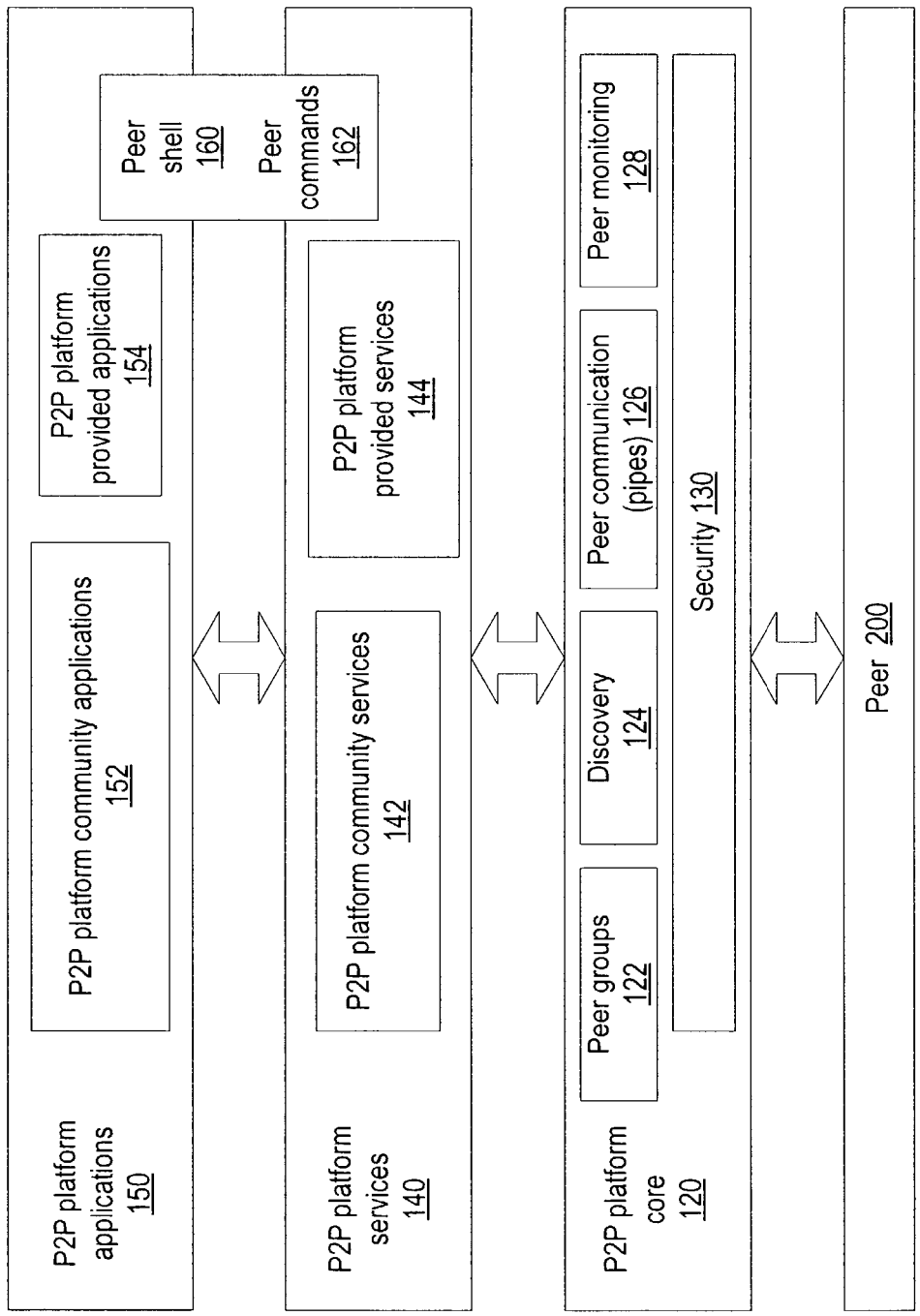
FIG. 12 illustrates one embodiment of peer-to-peer platform software architecture at the conceptual level.

FIG. 12 illustrates one embodiment of peer-to-peer platform software architecture at the conceptual level. The peer-to-peer platform may include several layers. In one embodiment, the software stack may be described using three layers; a peer-to-peer platform (core) layer 120, a service layer 140 and an application layer 150. In one embodiment, the peer-to-peer platform may include a core layer 120 that defines and encapsulates minimal primitives that are common to peer-to-peer networking, including, but not limited to, peers 110, peer groups 122, peer discovery 124, peer communication (e.g. pipes) 126, peer monitoring 128, and associated security primitives 130. This layer may be shared by all peer-to-peer devices so that interoperability becomes possible.

A peer may be defined as any entity that runs some or all of one or more protocols provided by the peer-to-peer platform core layer. As such, a peer may manifest in the form of a processor, a process or a device. A peer may be anything with a digital heartbeat that supports the peer-to-peer platform core, including sensors, servers, PCs, computers up to and including supercomputers, PDAs, manufacturing and medical equipment, phones and cellular phones. In order to interact with other peers (e.g. to form or join peer groups), the peer needs to be connected to some kind of network (wired or wireless), such as IP, Bluetooth, or Havi, among others.

The peer-to-peer platform may provide mechanisms through which peers may discover each other, communicate with each other, and cooperate with each other to form peer groups. Peers may discover each other on the network to form transient or persistent relationships called peer groups. A peer group is a collection of peers connected by a network that share a common set of interests and that have agreed upon a common set of rules to publish, share and access any computer content (code, data, applications, or other collections of computer representable resources), and communicate among themselves. Peer groups may also be statically predefined. The peers in a peer group may cooperate to provide a common set of services. A peer group may be viewed as an abstract region of the network, and may act as a virtual subnet. The concept of a region virtualizes the notion of routers and firewalls, subdividing the network in a self-organizing fashion without respect to actual physical network boundaries. In one embodiment, peer groups implicitly define a region scope that may limit peer propagation requests. Conceptually, a peer group may be viewed as a virtual entity that speaks the set of peer group protocols.

A peer group may theoretically be as large as the entire connected universe. Naming anything uniquely is a challenge in such a large namespace. In one embodiment, the peer-to-peer platform may support and/or provide sophisticated naming and binding services. In one embodiment, the peer-to-peer platform may use a universal unique identifier (UUID), for example, a 64- or 128-bit datum, to refer to an entity (e.g. a peer, peer group, pipe, content, etc.). For example, UUIDs may be embedded in advertisements for internal use. UUIDs may be used to guarantee that each entity has a unique UUID within a local runtime environment and serves as a canonical way of referring to an entity, but because a global state is not assumed, it may not be possible to provide a guarantee of uniqueness across an entire community that may consist of millions of peers. This may not be a problem because a UUID may be used within the peer-to-peer platform as an internal identifier. This may become significant only after the UUID is securely bound to other information such as a name and a network address. In one embodiment, Uniform Resource Name (URN) format may be used for the expression of UUIDs.

The core layer 120 provides core support for peer-to-peer services and applications. In a multi-platform, secure execution environment, the core mechanisms of peer groups, peer pipes and peer monitoring may be provided. Peer groups 122 may establish a set of peers and naming within a peer group with mechanisms to create policies for creation and deletion, membership, advertising and discovery of other peer groups and peer nodes, communication, security, and content sharing. Pipes provide virtual communication channels among peers. Messages sent in pipes may support transfer of data, content, and code in a protocol-independent manner, allowing a range of security, integrity, and privacy options. In one embodiment, messages may be structured with a markup language such as XML. Peer monitoring 128 enables control of the behavior and activity of peers in a peer group and can be used to implement peer management functions including access control, priority setting, traffic metering, and bandwidth balancing.

The core layer 120 may include protocols and building blocks to enable key mechanisms for peer to peer networking, including discovery, transport (including firewall handling and limited security), and the creation of peers and peer groups. The core layer 120 may be thin and small, and may provide interesting and powerful primitives for use by services and applications in the other layers. The core layer 120 may support choices such as anonymous vs. registered users and encrypted vs. clear text content without imposing specific policies on developers. Policy choices may be made, or when necessary, implemented, at the service layer 140 and/or application layer 150. For example, administration services such as accepting or rejecting a peer's membership in a peer group may be implemented using the functionality provided by the core layer 120.

The core components of the peer-to-peer protocol may be used to implement discovery mechanisms for searching, publishing and recovering of core abstractions (e.g. peers, peer group, pipes, endpoints, and advertisements). These mechanisms may be simple, administration free, and do not require special peers to act as "master" peers. These mechanisms may allow processes in the peer-to-peer network, in absence of help from other applications and/or services, to bootstrap and find out the information necessary to access applications and services that can help. Also, the core may "return" to this standalone behavior and still function if helper applications or services fail. In one embodiment, safety mechanisms may be put in place in order to avoid a major overflow of "webcrawling". In one embodiment, applications and/or services that support the peer-to-peer protocol may access, control, and/or override the core components, even to the extreme of implementing a centralized, client-server model based on the core components.

At the highest abstraction level, the peer-to-peer platform may be viewed as a set of protocols provided at the core layer 120. In one embodiment, a common thread among peer-to-peer platform peers is protocols, not APIs or software implementations. The peer-to-peer platform protocols may guarantee interoperability between compliant software components executing on potentially heterogeneous peer runtimes. Thus the peer-to-peer platform may be agnostic to programming languages. The term compliant may refer to a single protocol only. That is some peers may not implement all the core protocols. Furthermore, some peers may only use a portion (client-side or server-side only) of a protocol.

Each protocol may be defined by one or more messages exchanged among participants of the protocol. Each message may have a predefined format, and may include various data fields. In one embodiment the protocols may utilize messaging such as XML messages. The peer-to-peer platform connects peer nodes with each other. The peer-to-peer platform may be platform-independent by virtue of being a set of protocols. As such, the peer-to-peer platform may not require APIs and remains independent of programming languages, so that it can be implemented in C/C++, Java, Java 2ME, Perl, Python or other languages. This means heterogeneous devices with completely different software stacks may interoperate through the peer-to-peer platform protocols. To underpin this set of protocols, the peer-to-peer platform may define a number of concepts including peer, peer group, advertisement, message, pipe, and more.

In one embodiment, peer-to-peer protocols may be embodied as markup language (e.g. XML) messages that may be sent between two peers. In one embodiment, the peer-to-peer platform messages may define the protocols used to discover and connect peers and peer groups, and to access resources offered by peers and peer groups, among others. The use of markup language (e.g. XML) messages to define protocols may allow many different kinds of peers to participate in a protocol. Each peer may be free to implement the protocol in a manner best suited to its abilities and role. For example, not all peers are capable of supporting a Java runtime environment. In one embodiment, the protocol definition does not require nor imply the use of Java on a peer.

Several peer-to-peer platform protocols that may be provided by embodiments of the peer-to-peer platform are described later in this document. The protocols defined in this document may be realized over networks including, but not limited to, the Internet, a corporate intranet, a dynamic proximity network, a home networking environment, LANs, and WANs. The protocols defined in this document may also be realized within a single computer. Thus, the peer-to-peer platform may be transport protocol independent. The size and complexity of the network peers that may support these protocols may include a wide range of peer implementations including peers implemented on, but not limited to, simple light switches, PDAs, cell phones, pagers, laptop and notebook computers, smart appliances, personal computers, workstations, complex, highly-available servers, mainframe computers and even supercomputers.

The peer-to-peer platform may further include a peer-to-peer services layer 140. This layer may provide capabilities that may not be absolutely necessary for a peer-to-peer network to operate but that may be desirable to provided added functionality beyond the core layer 120 in the peer-to-peer environment. The service layer 140 may deal with higher-level concepts such as search and indexing, directory, storage systems, file sharing, distributed file systems, resource aggregation and renting, protocol translation, authentication and PKI (public key infrastructure) systems. These services, which may make use of the protocols and building blocks provided by the core layer 120, may be useful by themselves but also may be included as components in an overall P2P system. Thus, services may include one or more services 144 provided by the peer-to-peer platform. These platform-provided services 144 may include indexing, searching and file sharing services, for example. The services layer 140 may provide hooks for supporting generic services (such as searching, sharing and added security) that are used in many P2P applications. Thus, services may also include one or more services 142 not provided as part of the peer-to-peer platform but rather provided by the peer-to-peer platform community. These services 142 may be user-defined and may be provided, for example, to member peers in a peer group as a peer group service.

Services may expand upon the capabilities of the core layer 120 and may be used to facilitate application development. Facilities provided as services in the service layer 140 may include mechanisms for search and indexing, directory, storage systems, file sharing, distributed file systems, resource aggregation and renting, protocol translation, authentication, PKI services, and caching code and content to enable cross-application bridging and translation of files, among others. Searching capabilities may include distributed, parallel searches across peer groups that are facilitated by matching an XML representation of a query to be processed with representations of the responses that can be provided by each peer. These facilities may be used for simple searches, for example searching a peer's repository, or more complex searches of dynamically generated content that is unreachable by conventional search engines. P2P searches may be conducted across a company's intranet, for example, to quickly locate relevant information within a secure environment. By exercising tight control over peer group membership and enabling encrypted communication between peers, a company may extend this capability to its extranet, including business partners, consultants, and suppliers as peers. The same mechanisms that facilitate searches across the peer group may be used as a bridge to incorporate Internet search results, and to include data outside of the peer's own repository, for example searching a peer's disk. The peer services layer 140 may be used to support other custom, application-specific functions. For example, a secure peer messaging system may be built to allow anonymous authorship and a persistent message store. The peer services layer 140 provides the mechanisms to create such secure tools; the application developers themselves may determine specific tool policies.

The peer-to-peer platform may also include a peer-to-peer application layer 150. The application layer 140 may support the implementation of integrated applications such as file sharing, resource sharing, monetary systems, distributed storage, peer-to-peer instant messaging, entertainment, content management and delivery, peer-to-peer email systems, distributed auction systems, among others. Applications may be "vertical" or they may be developed to interoperate with other distributed applications. One or more applications 154 may be provided as part of the peer-to-peer platform. For example, one embodiment of the peer-to-peer platform may include a shell application 160 as a development environment built on top of the platform. The shell application may provide interactive access to the peer-to-peer platform via a simple command line interface 162.

Applications may also include community applications 152 not provided by the peer-to-peer platform. These community applications 152 may be user-defined and may be provided, for example, to member peers in a peer group as a peer group application.

In one embodiment, the boundary between services and applications is not rigid. An application to one customer can be viewed as a service to another customer. An application may use services. Services may serve as protocols that may be shared among various applications. An application may provide a user interface, a way to define a set of files to share, a way to initiate a search, a way to display the results, and a way to initiate a file transfer, for example. Such an application may make use of a set of services, for example a reliable point-to-point file transfer service, a distributed search service, and a discovery service to locate other peers, among others.

Applications may be built using peer services as well as the core layer 120. The peer-to-peer platform may support the fundamental levels broadly, and rely on the P2P development community to provide additional peer services and applications. Peer applications enabled by both the core layer 120 and peer services layer 140 may include P2P auctions that link buyers and sellers directly, with buyers able to program their bidding strategies using a simple scripting language, for example. Resource-sharing applications, such as SETI@home, may be built more quickly and easily, with heterogeneous, worldwide peer groups supported from day one. Instant messaging, mail, and calendaring services may facilitate communication and collaboration within peer groups that are secure and independent of service provider-hosted facilities. Virtually any other type of application may be build on top of the core layer 120 and services layer 140.

Some features, such as security, may manifest in all three layers and throughout a P2P system, albeit in different forms according to the location in the software architecture. The system may be modular, and may allow developers to pick and choose a collection of services and applications that suits their needs.

A typical peer-to-peer platform network may provide an inherently nondeterministic topology/response structure. In a peer-to-peer platform network, a specific resource request may not return for minutes, hours, or even days; in fact, it may never return at all. In addition, people from different parts of the world requesting the same resource are likely to get different copies of the resource from completely different locations. Peers may obtain content from multiple servers, ideally reaching a nearby one that is up and running. The original source peer need not service every resource request; in fact, it does not even have to be up and running. The nondeterministic structure may also help provide the optimized use of network bandwidth. The concentrated localized traffic congestion typical of today's Web doesn't affect P2P networking. The nondeterministic structure may also help provide a lowered cost of content distribution. The P2P network can absorb contents and replicate it for easy access. The nondeterministic structure may also help provide leveraged computing power from every node in the network. With asynchronous operations, a user may issue many requests for many resources or services simultaneously and have the network do the work. The nondeterministic structure may also help provide unlimited scalability. A properly designed P2P application may span the entire known connected universe without hitting scalability limits; this is typically not possible with centralized schemes. Note, however, that the peer-to-peer platform also may support deterministic, synchronous applications.

The peer-to-peer platform provides the ability to replicate information toward end users. Popular content tends to be replicated more often, making it easier to find as more copies are available. Peers do not have to always go back to the same peer to obtain the information they want, as is typical in the client/server model. Peers may obtain information from neighboring peers that have already cached the information. Each peer may become a provider to all other peers.

In one embodiment the peer-to-peer platform may enable peers to find content that is closest to them. This content may include data (e.g. files) or even services and applications. For example, if a peer node in an office peer-to-peer network using the peer-to-peer platform is moved, the peer-to-peer platform may allow the peer to automatically locate content (e.g. using a discovery service that participates in the discovery protocol) including services (e.g. a printer service and an email service) hosted by other peers closest to the peer's new location, without requiring any manual reconfiguration. Further, at least some content may be copied or moved to the peer in its new location and/or to other peers proximate to the new location.

The peer-to-peer platform may provide a decentralized environment that minimizes single points of failure and is not dependent on any centralized services. Both centralized and decentralized services may be developed on top of the peer-to-peer platform. With the addition of each new network peer, the network platform may become more robust as it expands. In the environment, services may be implemented to interoperate with other services giving rise to new P2P applications. For example, a P2P communications service like instant messaging may easily be added to a resource-sharing P2P application if both support at least the necessary peer-to-peer platform protocols.

The peer-to-peer platform may provide interoperability. The peer-to-peer platform may be used by developers independent of preferred programming languages, development environments, or deployment platforms. Embodiments of the peer-to-peer platform may enable interconnected peers to easily locate each other, communicate with each other, participate in community-based activities, and offer services to each other seamlessly across different P2P systems and different communities. The peer-to-peer platform may also provide platform independence. Embodiments of the peer-to-peer platform may be independent of programming languages (such as C/C++, Java, Perl, and KVM), system platforms (such as the Microsoft Windows, UNIX®, Solaris, Linux and Macintosh platforms), and networking platforms (such as TCP/IP, Bluetooth and Havi). Thus, heterogeneous devices with completely different software stacks may interoperate through the peer-to-peer platform protocols. Embodiments of the peer-to-peer platform may be implementable on any device with a digital heartbeat, including, but not limited to, sensors, consumer electronics, Personal Digital Assistants (PDAs), appliances, network routers, desktop computers, data-center servers, and storage systems. Embodiments of the peer-to-peer platform may enable peers, independent of software and hardware platform, to benefit and profit from being connected to millions of other peers.

In one embodiment, the peer-to-peer platform may run on any of various operating systems including embedded operating systems (with the appropriate level of Java runtime support, if required) such as Windows95, 98, 2000, ME, and NT, Solaris, Unix, Macintosh, Linux, Java 2 Platform, Micro Edition (J2ME) and PersonalJava Technology. The peer-to-peer platform may be implemented in any of a variety of development environments using any of a variety of programming languages, or combinations of programming languages, including, but not limited to, Java, Java 2ME, C/C++, Perl, Python and KVM. In one embodiment, the peer-to-peer platform may be implemented in Java. In one embodiment, a peer-to-peer platform may be implemented in C/C++ on some devices, for example, to support devices without Java support. In one embodiment, a peer-to-peer platform may be implemented in KVM on some devices, for example, so that all KVM capable devices such as PDAs and cell phones can be peer-to-peer platform peers. Programming languages other than those listed may also be used in various embodiments.

A minimal device with the ability to generate a text string may theoretically participate in a peer-to-peer platform network (though not necessarily in every P2P application). The simplistic device may need a surrogate peer on the P2P network. This surrogate peer may perform discovery, advertisement, and communications on behalf of the simplistic device (or many simplistic devices). The location of the surrogate may be hard-wired into the simplistic device. In this way, the simplistic device with the help of the surrogate can be a full-fledged peer on the peer-to-peer platform network. For example, a GPS locator, strapped to a sea turtle and sending out peer-to-peer platform messages wirelessly with location information, may become a peer on a peer-to-peer platform network.

The peer-to-peer platform may be independent of transport protocols. For example, the peer-to-peer platform may be implemented on top of TCP/IP, HTTP, Bluetooth, HomePNA, and other protocols. Thus, a system built on top of the peer-to-peer platform may function in the same or similar fashion when the system is expanded to a new networking environment or to a new class of devices, as long as there is a correct transport protocol handler for the new networking protocol.

In one embodiment, the peer-to-peer platform may use XML as the encoding format. XML may provide convenience in parsing and extensibility. Other embodiments of the peer-to-peer platform may use other encoding formats. The use of XML does not imply that all peer-to-peer platform peer nodes must be able to parse and to create XML documents. For example, a cell phone with limited resources may be programmed to recognize and to create certain canned XML messages and can still participate in a peer-to-peer platform network of peers. In one embodiment, a lightweight XML parser may be used that supports a subset of XML. This may help reduce the size of the peer-to-peer platform.

There may be areas in a peer-to-peer environment where there is not one correct way to do something or where what should be done depends on the nature and context of the overriding application. For example, in the area of security, every P2P application may choose a different authentication scheme, a different way to ensure communication security, a different encryption algorithm for data security, a different signature scheme for authenticity, and a different access control policy. Therefore, for these areas, the peer-to-peer platform may focus on mechanisms instead of policy, so that application developers can have the maximum freedom to innovate and offer competitive solutions.

Implementations of the peer-to-peer platform may be illustrated with a few application or usage scenarios. For example, assume there is a peer-to-peer community offering a search capability for its members, where one member can post a query and other members can hear and respond to the query. One member is a Napster user and has implemented a feature so that, whenever a query is received seeking an MP3 file, this member will look up the Napster directory and then respond to the query with information returned by the Napster system. Here, a member without any knowledge of Napster may benefit because another member implemented a bridge to connect their peer-to-peer system to Napster. The peer-to-peer platform may provide a platform bridge that may be used to connect the various peer-to-peer systems together.

In another example, one engineering group requires a sizable storage capability, but also with redundancy to protect data from sudden loss. Using the peer-to-peer platform, each group may buy a simple storage system without a mirroring feature, where the disks can then discover each other automatically, form a storage peer group, and offer mirroring facilities using their spare capacity.

As yet another example, many devices such as cell phones, pagers, wireless email devices, Personal Digital Assistants (PDAs), and Personal Computers (PCs) may carry directory and calendar information. Using the peer-to-peer platform, these devices may be able to interact with each other, without extra networking interfaces except those needed by the devices themselves, using the peer-to-peer platform as the common layer of communication and data exchange.

Peers

Network nodes (peers) of various kinds may join the peer-to-peer networking platform by implementing one or more of the platform's protocols. Each peer operates independently and asynchronously of any other peer, providing a degree of reliability and scalability not typically found in current distributed systems. Some peers may have more dependencies with other peers due to special relationships (e.g. gateways or routers). In one embodiment, a peer does not need to understand all of the protocols of the peer-to-peer platform. The peer can still perform at a reduced level if it does not support one or more of the protocols.

Peers may publish and provide network resources (e.g. CPU, storage and routing resources) that may be used by other peers. Peers typically interact with a small number of other peers (network neighbors or buddy peers). Peers that provide the same set of services tend to be inter-changeable. Thus, it may not matter which peers a peer interacts with. Generally, assumptions should not be made about peer reliability or connectivity, as a peer may appear or leave the network at any time. Peers may have persistent storage. A peer may optionally cache information.

Peers may have multiple network interfaces, though a peer may not need to publish all of its interfaces for use with the peer-to-peer protocols. Each published interface may be advertised as a peer endpoint. In one embodiment, a peer endpoint is an identifier (e.g. a URN or URI) that uniquely identifies a peer network interface. Peer endpoints may be used by peers to establish direct point-to-point connection between two peers. Peers may not have direct point-to-point network connection between themselves, either due to lack of physical network connections, or network configuration (NATs, firewalls, proxies, etc.), and thus a peer may have to use one or more intermediary peers to route a message from an endpoint to another peer endpoint.

Peers may be identified by their unique ID (UUID) rather than by a fixed address. When a peer boots, it attempts to contact other peers. In one embodiment, contacted peers may include variable-sized caches that map nearby peers' UUID to their current address. This allows embodiments of the peer-to-peer platform to be run over a dialup connection, for example.

In one embodiment, a peer may be assigned a unique string as a name. Any naming scheme may be used. In one embodiment, names are not unique unless a coordinated naming service is used to guarantee name uniqueness. A naming service is typically a centralized service that guarantees the uniqueness of name and can be used to register name mapping. Examples of naming services are DNS and LDAP. Use of a naming service may be optional.

Peer Groups

Figure 13:
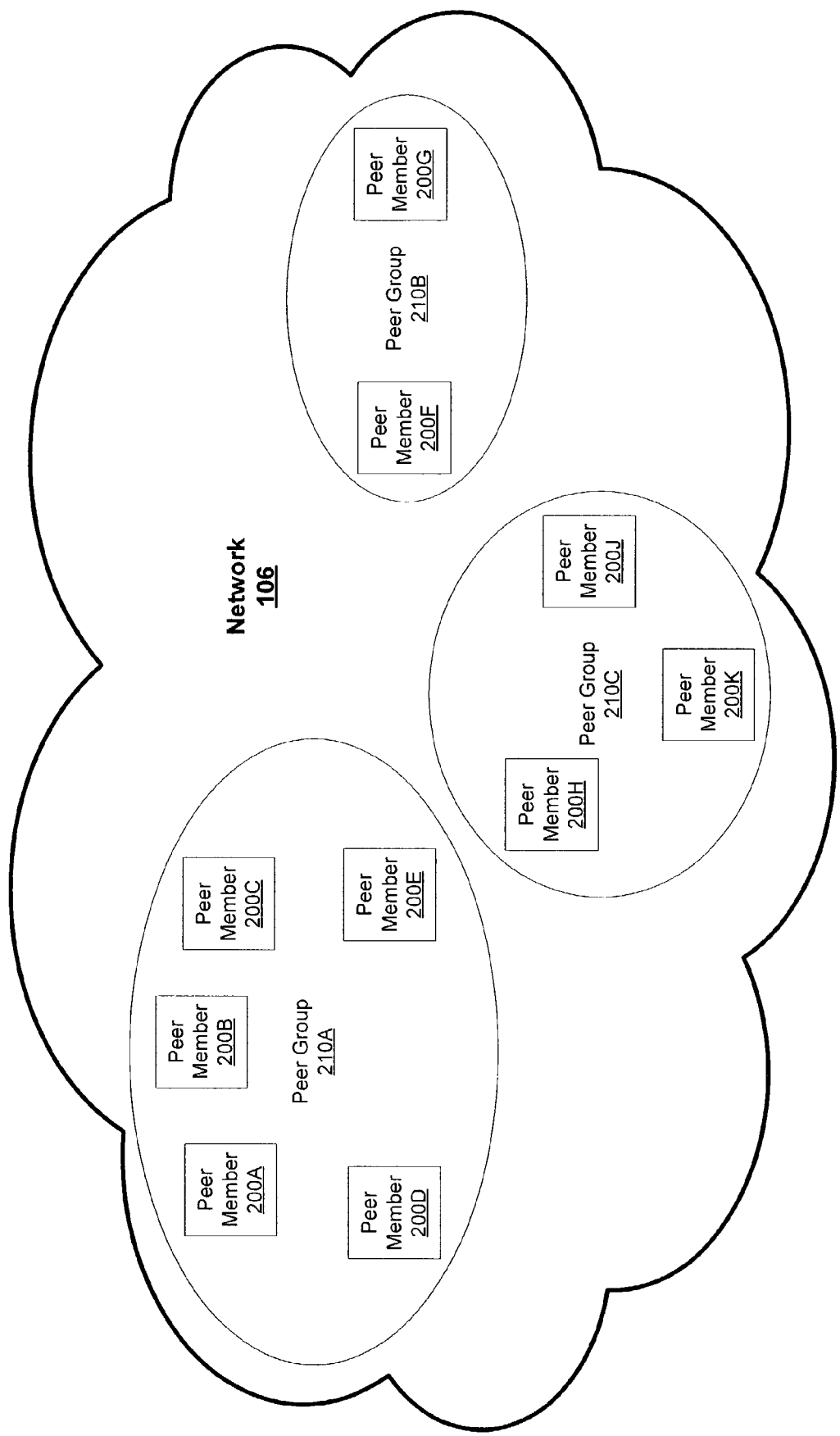
FIG. 13 illustrates an exemplary network with peer groups according to one embodiment.

FIG. 13 illustrates an exemplary network with peer groups according to one embodiment. Network 106 may include, but may not be limited to, the Internet, a corporate intranet, a dynamic proximity network, a home networking environment, LANs, and WANs supporting standards such as IP, Bluetooth, and Havi, among others. The peer groups may divide the network into virtual networks. For example, peer member 200F and peer member 200G are members of the same virtual network provided by peer group 210B. The peer groups may define limited domains of message and service availability thereby providing scope for communications and service access. For example, peer member 200H may broadcast a message over the virtual network provided by peer group 210C. This message may reach peer member 200J and peer member 200K, but may be restricted from reaching (or may be ignored by) peers in peer group 210A and 210B.

The peer-to-peer platform may describe how to create and discover peer groups, but does not dictate when, where, or why to create a peer group, the type of the group, or the membership of the group. A peer group may provide a common membership definition. Each peer group may establish its own membership policy in a range from open (any peer can join) up to highly secure and protected (a peer may join only if it possesses sufficient credentials).

In one embodiment, peers wishing to join a peer group may first locate a current member, and then request to join the peer group. The peer-to-peer platform may define how to discover peer groups, e.g. using a peer discovery protocol. The application to join may be rejected or accepted by the collective set of current members in accordance with the peer group's membership policy. In one embodiment, a peer group core membership service may be used to enforce a vote among one or more group members. Alternatively, one or more group representative member peers may be elected or appointed to accept or reject new membership applications.

In one embodiment, the peer-to-peer platform is not concerned with what sequence of events a peer or a peer group comes into existence. Moreover, in one embodiment, the peer-to-peer platform does not limit how many groups a peer can belong to. In one embodiment, nested and/or overlapping peer groups may be formed.

Figure 14:
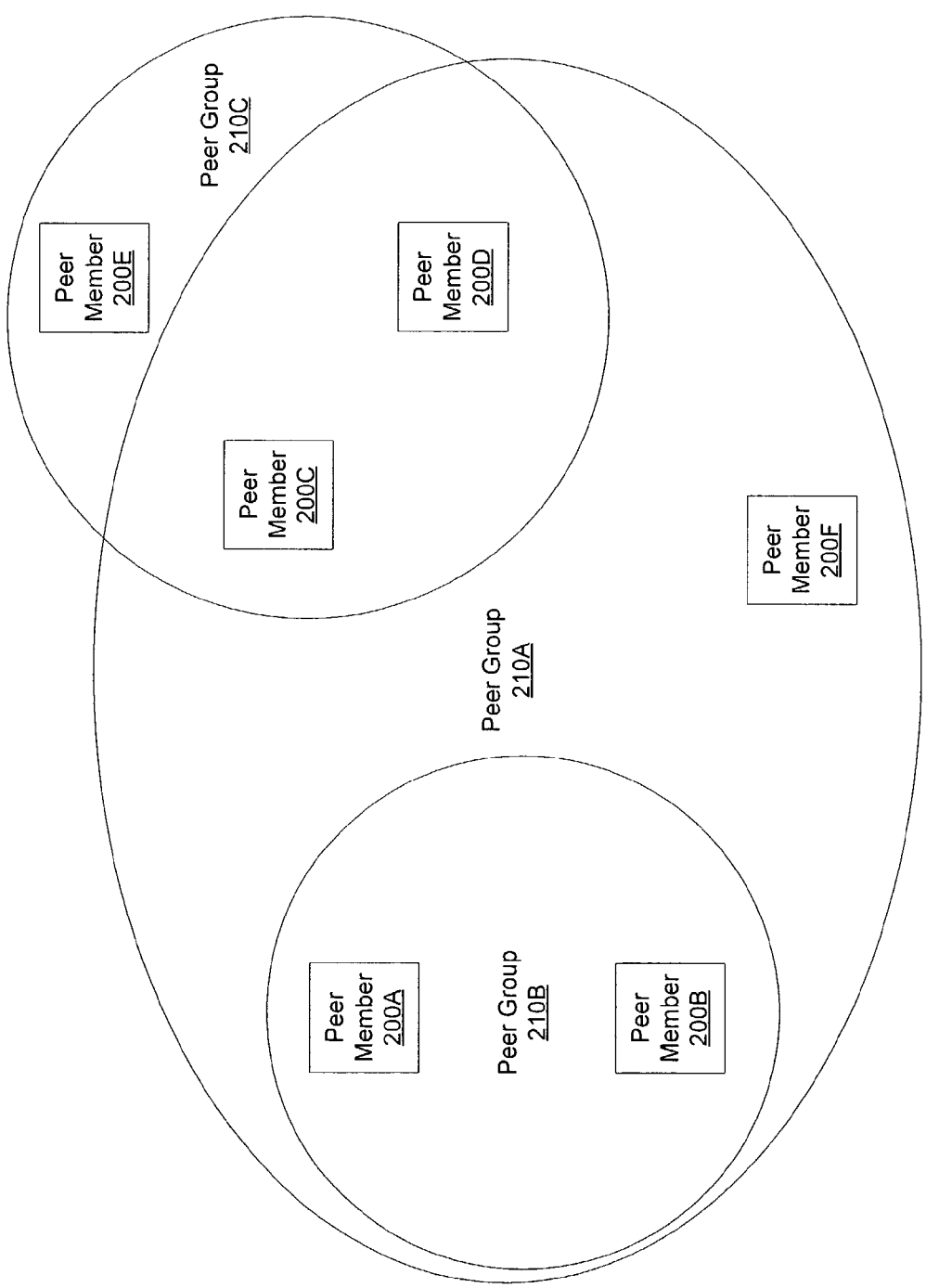
FIG. 14 illustrates nested peer groups and overlapping peer groups according to one embodiment.

FIG. 14 illustrates nested peer groups according to one embodiment. Peer group 210B may be nested within peer group 210A by virtue of all of peer group 210B's members, peer member 200A and peer member 200B, also being members of peer group 210A. Peer member 200A and peer member 200B may access services provided by both peer group 210A and peer group 210B, but peer member 200F may not have access to services provided by peer group 210B.

FIG. 14 further illustrates overlapping peer groups according one embodiment. Peer group 210A and peer group 210C may overlap by virtue of having peer member 200C and peer member 200D in common. Peer member 200C and peer member 200D may access services provided by peer group 210A and peer group 210C. Peer member 200E may access services provided by peer group 210C, but may not have access to services provided by peer group 210A. Likewise, peer member 200F of peer group 210A may not have access to services provided by peer group 210C.

In one embodiment, there may be a special group, called the World Peer Group, which may include all peer-to-peer platform peers. The world peer group may provide the minimum seed for every peer to potentially find each other and form new groups. In one embodiment, the world peer group has an open membership policy (e.g. has a null membership authenticator service). Some peers inside the world peer group may not be able to discover or communicate with each other—e.g., they may be separated by a network partition. In one embodiment, participation in the World Peer Group is by default.

The peer-to-peer platform may use the concept of a peer group as an implicit scope of all messages originated from within the group. Peer groups may serve to subdivide the network into abstract regions providing an implicit scoping mechanism. Peer groups may provide a limited scoping environment to ensure scalability. Peer groups may be formed and self organized based upon the mutual interest of peers. In one embodiment, no particular rules are imposed on the way peer groups are formed, but peers with the same interests may tend to join the same peer groups.

In one embodiment, a scope may be realized with the formation of a corresponding peer group. Peer group boundaries may define the search scope when searching for a group's content. For example, a peer in San Francisco looking to buy a used car is normally not interested in cars available outside of the Bay Area. In this case, the peer may want to multicast a message to a subset of the current worldwide peer group, and a subgroup may be formed especially for this purpose. In one embodiment, the multicast may be done without the formation of a new peer group. In one embodiment, all messages may carry a special scope field, which may indicate the scope for which the message is intended. Any peer who receives this message may propagate the message based on the scope indicator. Using this approach, a sending peer may be bootstrapped with some well-defined scopes, and additional scopes may be discovered.

Peer groups may also be formed based upon the proximity of the member peers. Proximity-based peer groups may serve to subdivide the network into abstract regions. Regions may serve as a placeholder for general communication and security configurations that deal with existing networking infrastructure, communication scopes and security requirements. Peer groups may provide a scoping mechanism to reduce traffic overload.

Peer groups may provide a secure cooperative environment. Peer group boundaries permit member peers to access and publish protected contents. Peer groups form virtual secure regions which boundaries limit access to the peer group resources. Secure services may be provided to peers within a secured peer group. Their boundaries may or may not reflect any underlying physical network boundaries such as those imposed by routers and firewalls. The concept of a region may virtualize the notion of routers and firewalls, subdividing the network into secure regions in a self-organizing fashion without respect to actual physical network boundaries.

Peer groups may also create a monitoring environment. Peer groups may permit peers to monitor a set of peers for any special purpose (heartbeat, traffic introspection, accountability, etc.). Peer groups may also provide a controlled and self-administered environment. Peer groups may provide a self-organized structure that is self-managed and that may be locally managed.

Peer groups using the peer-to-peer platform may provide several capabilities including, but not limited to, the ability to, find nearby peers, find named peers anywhere on the network, find named peer groups anywhere on the network, join and resign from a peer group, establish pipes between peer group members and find and exchange shared content.

Peers may be grouped into peer groups to share content. A content is published and shared among the peer members of a peer group. In one embodiment, content may be shared among group members, but not between groups. In this embodiment, no single item of content may belong to more than one group. If the same content is published in two different peer groups, two different contents may be created. In one embodiment, a content item may be published to make the item's existence known and available to group members using advertisements. A content may be any computer content (e.g. code, data, applications, active content such as services, or other collection of computer-representable resources). Examples of content include, but are not limited to, a text file, a structured document (e.g. a PDF or a XML file), a Java ".jar" or loadable library, code or even an executable process (checkpointed state).

Pipes may provide the primary channels for communication among peers and are a mechanism for establishing communication between peers. Pipes may be used as communication channels for sending and receiving messages between services or applications over peer endpoints. Pipes may connect peers that have a direct physical link and peers that do not have a direct physical link. In the latter case, one or more intermediary peer endpoints may be used to route messages between the two pipe endpoints. A pipe instance is, logically speaking, a resource within a peer group. The actual implementation of a pipe instance is typically through a pipe service. In one embodiment, at each endpoint, software to send, or receive, as well as to manage optional associated pipe message queues is assumed, but not mandated. In one embodiment of the peer-to-peer platform, pipes may be asynchronous, unidirectional, stateless and unreliable to provide the lowest overhead. In one embodiment, enhanced pipes with additional properties such as bi-directionality, reliability, security, and quality of service may be supported.

The pipe endpoints may be referred to as input pipes (receiving end) and output pipes (sending end). Pipes may provide the illusion of a virtual in and out mailbox that is independent of any single peer location. Services and applications may communicate through pipes without knowing on which physical peer a pipe endpoint is bound. Using pipes, developers may build highly available services where pipe connections may be established independently of a peer location. This dynamic binding of pipes helps to provide redundant implementation of services over a P2P network.

Figure 15:
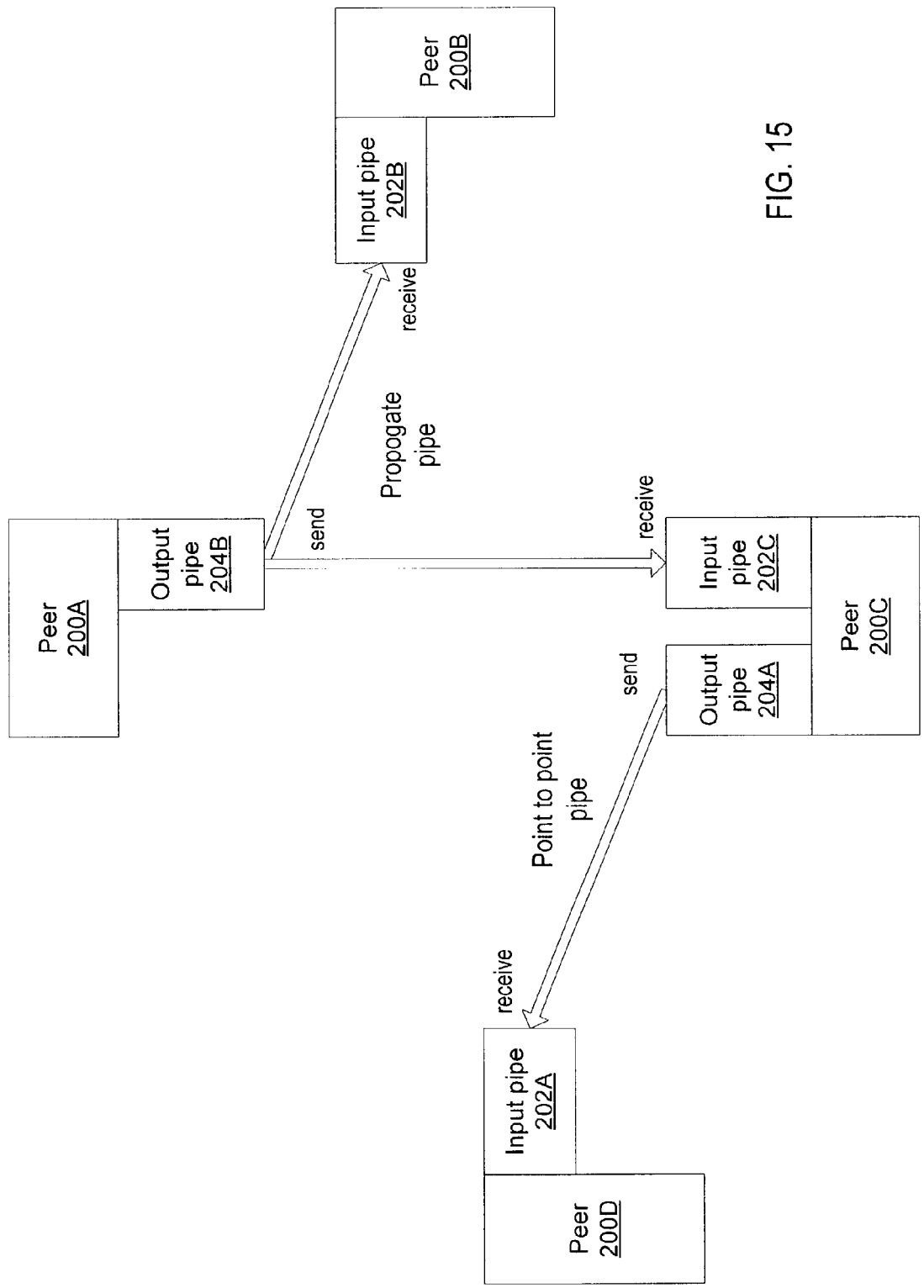
FIG. 15 illustrates a point-to-point pipe connection between peers according to one embodiment.

Pipes may offer several modes of communication. FIG. 15 illustrates a point-to-point pipe connection between peers 200C and 200D according to one embodiment. In one embodiment, a point-to-point pipe connects exactly two peer endpoints together, an input pipe 202A that receives messages sent from an output pipe 204A. The pipe appears as an output pipe to the sender and as an input pipe to the receiver, with traffic going in one direction only—from the sender to the receiver. In one embodiment, no reply or acknowledgement operation is supported. In one embodiment, additional information in the message payload (for example, a unique ID) may be required to thread message sequences. The message payload may also contain a pipe advertisement that can be used to open a pipe to reply to the sender (send/response).

FIG. 15 further illustrates a propagate pipe with peer 200A as a propagation source and peers 200B and 200C with listening input pipes according to one embodiment. A propagate pipe may connect two or more peer endpoints together, from one output pipe 204B to one or more input pipes (e.g. 202B and 202C). The result is that any message sent into the output pipe is sent to all input pipes. Messages flow into the input pipes from the output pipe (propagation source). A propagate message may be sent to all listening input pipes. This process may create multiple copies of the message to be sent. On transports that provide multicast (e.g. TCP/IP), when the propagate scope maps to underlying physical subnets in a one-to-one fashion, transport multicast be may used as an implementation for propagate. Propagate may be implemented using point-to-point communication on transports that do not provide multicast such as HTTP.

Peers may cooperate and communicate to publish, discover and invoke network services. A service denotes a set of functions that a provider offers. In one embodiment, a peer-to-peer platform peer can offer a service by itself or in cooperation with other peers. In one embodiment, a peer may publicize a service by publishing a service advertisement for the service. Other peers may then discover the service using the peer discovery protocol (through the advertisement) and make use of it. A peer may publish as many services as it can provide.

In one embodiment, the peer-to-peer platform may define peer group core services including, but not limited to, a discovery service, a membership service, an access service, a pipe service, a resolver service and a monitoring service. A discovery service may be used to search for peer group resources such as peers, peer groups, and pipes. The search criteria may include a resource name. Discovery and discovery services are described more fully later in this document.

In one embodiment, most peer groups will have at least a membership service. Current peer group members may use the membership service during the login process to reject or accept a new peer group membership application. The membership service may be a "null" authenticator service that imposes no real membership policy. Peers wishing to join a peer group first locate a current member, and then request to join. The application to join may be either rejected or accepted by the collective set of current members. The membership service may enforce a vote of peers or alternatively elect a designated group representative to accept or reject new membership applications.

An access service may be used to validate, distribute, and authenticate a group member's credentials. The access service may define the type of credential used in the message-based protocols used within the peer group. The access service may be used to validate requests made by one peer to another. The peer receiving the request provides the requesting peer's credentials and information about the request being made to the access service to determine if the access is permitted. In one embodiment, not all actions within the peer group need to be checked with the access service, only those actions which only some peers are permitted to use.

A pipe service may be used to manage and create pipe connections between the different peer group members. A resolver service may be used to send query string to peers to find information about a peer, a peer group, a service or a pipe. A monitoring service is used to allow one peer to monitor other members of the same peer group.

In one embodiment, not all the above services are required to be implemented by a peer group. Each service may implement one or more of the peer-to-peer platform protocols. A service may implement one protocol for simplicity and modularity reasons, but some services may not implement any protocols.

In one embodiment, the peer-to-peer platform core services may provide a reference implementation for user-defined services. Examples of user defined services may include, but are not limited to: efficient long-distance peer lookup and rendezvous using a peer naming and discovery service; simple, low-cost information search and indexing using a content sharing service; interoperability with existing centralized networking infrastructure and security authorities in corporate, public, private, or university networks using administration services; a resolver service may be implemented to find active (running on some peer) and inactive (not yet running) service instances; and an FTP service that allows file transfers among peers over pipes using FTP.

Advertisements

In one embodiment, the peer-to-peer protocols may use advertisements to describe and publish the existence of peer resources. An advertisement may be defined as a structured, language neutral metadata structure that names, describes, and publishes the existence of a peer-to-peer platform resource, such as a peer, a peer group, a pipe, or a service. Information exchanged between peers may include advertisement documents. The peer-to-peer platform may include advertisement documents to represent all of the peer-to-peer platform resources managed by the core platform, such as peers, peer groups, pipes and services. In one embodiment, the peer-to-peer platform may define core advertisement types including, but not limited to, one or more of peer advertisements, peer group advertisements, pipe advertisements, service advertisements, content advertisements, and endpoint advertisements. In one embodiment, user-defined advertisement subtypes (for example, using XML schemas) may be formed from these basic types.

Peer-to-Peer Platform Protocols

The peer-to-peer platform protocols may provide and support ad hoc, pervasive, and multi-hop peer-to-peer (P2P) network computing. Using the protocols, peers may cooperate to form self-organized and self-configured peer groups independently of their positions in the network (e.g. edges, firewalls), and without the need of a centralized management infrastructure. The peer-to-peer platform protocols may have very low overhead, make few assumptions about the underlying network transport and limited requirements of the peer environment, and may be used to deploy a wide variety of P2P applications and services in a highly unreliable and changing network environment.

In one embodiment, the peer-to-peer platform may include core protocols including, but not limited to, a peer membership protocol, a peer discovery protocol, a peer resolver protocol, a peer information protocol, a pipe binding protocol, and a peer endpoint protocol. These protocols may be implemented using a common messaging layer. This messaging layer binds the protocols to various network transports. In one embodiment, the peer-to-peer platform protocols may be specified as a set of markup language (e.g. XML) messages exchanged between peers. Each software platform binding describes how a message is converted to and from a native data structures such as a Java object or 'C' structure. In one embodiment, the use of markup language messages to define protocols allows many different kinds of peers to participate in a protocol. Each peer is free to implement the protocol in a manner best suited to its abilities and role. Peer-to-peer platform messages are described previously in this document.

In one embodiment, each of the protocols is independent of the others. A peer may not be required to implement all of the networking protocols. A peer may implement only the protocol that it requires. For example, a device may have all the advertisements it uses pre-stored in memory, so that peer does not need to implement the Peer Discovery Protocol. As another example, a peer may use a pre-configured set of peer routers to route all its messages, hence the peer does not need to implement the Peer Endpoint protocol. Instead, the peer sends messages to the routers to be forwarded. As yet another example, a peer may not need to obtain or wish to provide status information to other peers, hence the peer does not to implement the peer information protocol. The same can be said about all of the other protocols. In one embodiment, a peer may implement only a portion (client-side or server-side only, for example) of a protocol.

Peers may use the peer-to-peer platform protocols to advertise their resources and to discover network resources (services, pipes, etc.) available from other peers. Peers may form and join peer groups to create special relationships. The peer-to-peer platform protocols may allow peers to communicate without needing to understand or manage the potentially complex and dynamic network topologies that are becoming common. Peers may cooperate to route messages allowing for full peer connectivity. The peer-to-peer platform protocols allow peers to dynamically route messages across multiple network hops to any destination in the network (potentially traversing firewalls). Each message may include either a complete or a partial ordered list of gateway peers through which the message might be routed. If route information is incorrect, an intermediate peer may assist in dynamically finding a new route. A peer-to-peer platform protocol message that is routed through multiple hops may not be assumed to be reliably delivered, even if only reliable transports such as TCP/IP are used through all hops. A congested peer may drop messages at any time rather than routing them.

The peer-to-peer platform protocols may be implemented on a variety of networks including, but not limited to, the Internet, corporate intranets, dynamic proximity networks, home networking environments, LANs and WANs. The peer-to-peer platform protocols may allow the peer-to-peer platform to be easily implemented on unidirectional links and asymmetric transports. In particular, many forms of wireless networking do not provide equal capability for devices to send and receive. The peer-to-peer platform permits any unidirectional link to be used when necessary, improving overall performance and network connectivity in the system. Thus, the peer-to-peer platform protocols may be easy to implement on any transport. Implementations on reliable and bidirectional transports such as TCP/IP or HTTP may provide efficient bidirectional communications. Even on bidirectional transports, communication ability between any pair of peers may at times not work equally well in both directions. That is, communications between two peers will in many cases be able to operate bidirectionally, but at times the connection between two peers may be only unidirectional, allowing one peer to successfully send messages to the other while no communication is possible in the reverse direction. The peer-to-peer platform unidirectional and asymmetric transport also plays well in multi-hop network environments where the message latency may be difficult to predict. Furthermore, peers in a P2P network tend to have nondeterministic behaviors and thus may appear or leave the network very frequently.

In one embodiment, the peer-to-peer platform protocols do not require a broadcast or multicast capability of the underlying network transport. Messages intended for receipt by multiple peers (propagation) may be implemented using point-to-point communications. The peer-to-peer platform protocols may not require periodic messages of any kind at any level to be sent within the network, and thus may not require periodic polling, link status sensing, or neighbor detection messages, and may not rely on these functions from any underlying network transport in the network. This entirely on-demand behavior of the protocols and lack of periodic activity may allow the number of overhead messages generated by the peer-to-peer platform to scale all the way down to near or at zero, when all peers are stationary with respect to each other and all routes needed for current communication have already been discovered.

In one embodiment, the peer-to-peer platform protocols are defined as idempotent protocol exchanges. The same messages may be sent/received more than once during the course of a protocol exchange. In one embodiment, no protocol states are required to be maintained at both ends. Due to the unpredictability of P2P networks, assumptions may not be made about the time required for a message to reach a destination peer, and thus the peer-to-peer platform protocols may not impose any timing requirements for message receipt.

The peer-to-peer platform protocols may take advantage of additional optimizations, such as the easy ability to reverse a source route to obtain a route back to the origin of the original route.

Figure 16:
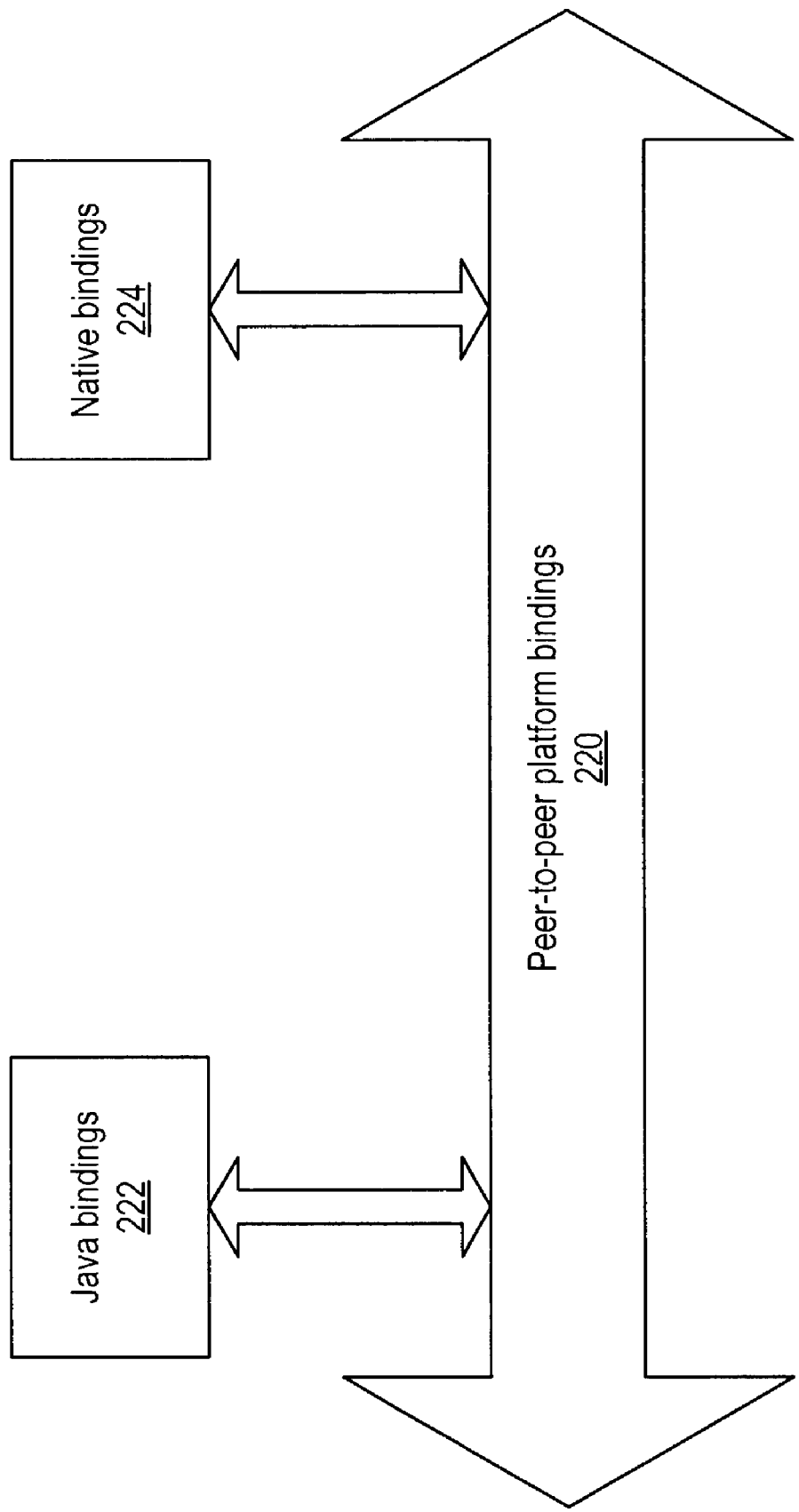
FIG. 16 illustrates protocols and bindings in a peer-to-peer platform according to one embodiment.

FIG. 16 illustrates protocols and bindings in a peer-to-peer platform according to one embodiment. When the peer-to-peer platform protocols are implemented using a particular programming language and over a particular transport protocol, the implementation is an instance of a peer-to-peer platform binding 220, where the peer-to-peer platform protocols are bound to the language and the transport layer. In one embodiment, protocol and peer software implementation issues may be defined in documents specific to the binding. A binding document describes how the protocols are bound to an underlying network transport (such as TCP/IP or UDP/IP) or to a software platform 222 such as Java or a native software platform 224 such as UNIX.

Peer Discovery Protocol

In one embodiment, the peer-to-peer platform may include a peer discovery protocol that may allow a peer to find advertisements on other peers. The peer discovery protocol may be used to discover any published peer resources including other peers, peer groups, pipes, services and any other resource that has an advertisement in the peer-to-peer network. This protocol may be used to find members of any kind of peer group, presumably to request membership. In one embodiment, the peer discovery protocol is the default discovery protocol for all peer groups, including the world peer group. The discovery protocol may be used as a default discovery protocol that allows all peer-to-peer platform peers to understand each other at a very basic level.

The peer discovery protocol may provide, at the lowest level, the minimum building blocks for propagating discovery requests between peers. Thus, the peer discovery protocol may provide the essential discovery infrastructure for building high-level discovery services. In many situations, discovery information is better known by a high-level service, because the service may have a better knowledge of the topology (firewall traversal), and the connectivity between peers. The peer discovery protocol may provide a basic mechanism to discover advertisements while providing hooks so high-level services and applications can participate in the discovery process. Services may be able to give hints to improve discovery (i.e. decide which advertisements are the most valuable to cache).

In one embodiment, the peer discovery protocol may be based on web crawling and the use of rendezvous peers. Rendezvous peers are peers that offer to cache advertisements to help others peers discover resources, and propagate requests they cannot answer to other known rendezvous peers. Rendezvous peers and their use in the discovery process are discussed later in this document.

In one embodiment, custom discovery services may choose to leverage the peer discovery protocol. If a peer group does not have its own discovery service, the peer discovery protocol may be used to probe peers for advertisements. Rendezvous peers may keep a list of known peers and peer groups. This list may or may not be exhaustive or timely. A custom discovery service (if it knew that the region's rendezvous did keep a timely exhaustive list), for example, may discover all peers in the region by sending a single message to the rendezvous peer.

In one embodiment, peer discovery may be done with, or alternatively without, specifying a name for the peer to be located and/or the group to which peers belong. When no name is specified, all discovered advertisements of the requested type may be returned. If a probing peer provides the name of the peer to be located, a simple translation may be requested that returns that peer's advertisement. Once a peer is discovered, ping, status, and capability messages may be sent to its "main" endpoint(s) using a peer information protocol. Peers may export more than one endpoint. Each peer may designate at least one primary endpoint to handle the low-level housekeeping protocols such as the peer discovery protocol and the peer information protocol.

In one embodiment, the peer discovery protocol may be used to probe network peer groups looking for peers that belong to specified peer groups. This process may be referred to as screening. Peers may be screened for membership by presenting each candidate member with a peer group name (string matched with the peer group advertisement canonical name). In one embodiment, peers claiming to belong to this group may respond, while other peers do not respond. The peer discovery protocol may be used to discover any type of core advertisement including, but not limited to: peer advertisements, peer group advertisements, pipe advertisements and service advertisements.

Peer groups may need customizable and adaptable discovery policies. In one embodiment, the peer-to-peer platform may be policy-agnostic, and may only provide the basics for discovery. The basics may include one or more core discovery protocols including, but not limited to, a propagate protocol (broadcast within a scope range (subnet or peer group members)), a rendezvous protocol (unicast to a trusted discovery peer) and an invite protocol (reverse discovering).

A discovery policy may be implemented in a discovery service based on the core discovery protocol. In one embodiment, a discovery service in the core peer-to-peer platform may be used to discover abstractions and/or entities in the peer-to-peer network including, but not limited to, peers, peer groups, peer group policies (group defined services) and pipe endpoints.

In some embodiments of a peer-to-peer platform, the discovery service may rely on trusted peers (discovery proxies). The discovery service may leverage local neighbors (local propagate). The discovery service may use rendezvous peers (indexes). The discovery service may leave traces in discovery proxies (cache). The discovery service may use net crawling as a last resort (propagate between trusted discovery proxies). In one embodiment, a discovery service may not discover some entities in the peer-to-peer network including, but not limited to, content (large scale; in one embodiment, a content management service may be used for content discovery), metadata (maintain relationship between data), users, and applications.

Embodiments of a peer-to-peer platform discovery service may leverage surrounding peers and peer groups, provide meetings points for far away peers and groups, use an asynchronous protocol and provide reverse discovery. The discovery service may be used to find new neighbor peers and provide the ability for a peer to learn about other peer's abilities. Embodiments of a discovery service in the peer-to-peer platform may provide extensibility, spontaneous configuration, adaptive connectivity, a dynamic (i.e. no fixed) network topology, and the ability to reach the "edge of the Internet" (firewall, and NAT).

Embodiments of a discovery method in the peer-to-peer platform may not require centralized naming (e.g. no DNS). A discovery service may provide predefined meeting points that may be used in platform bootstrapping. The discovery service may support a dynamic environment (peers may come and go). The discovery service may support an unreliable environment (peers may fail). The discovery service may help to adapt to a changing environment through viral behavior. The discovery service may be used to improve performance as a system ages (increase locality). The discovery service may be used in support of security (change of physical location). The discovery service may be used that provides administrationless discovery (zero-admin).

Embodiments of the peer-to-peer platform discovery service may allow a peer to learn about other peers that discover it. In one embodiment, the peer-to-peer platform discovery service may provide application-managed rendezvous. In one embodiment of the peer-to-peer platform, a peer discovery protocol may support a discovery query message and a discovery response message to be used in the peer discovery process.

Peer groups need customizable and adaptable discovery policies. One approach to implementing a discovery policy is to start simple and build more complex policies. Embodiments of the peer-to-peer platform discovery service may support discovery methods including, but not limited to: Propagate Discovery (unicast to predefined rendezvous; leverage transport dependent multicast (e.g. IP)) and; Unicast Discovery (unicast to known rendezvous for forward propagation; may be used for reverse Discovery).

The peer-to-peer platform may not mandate exactly how discovery is done. Discovery may be completely decentralized, completely centralized, or a hybrid of the two. Embodiments of the peer-to-peer platform may support discovery mechanisms including, but not limited to:

- LAN-based discovery. This is done via a local broadcast over the subset.
- Discovery through invitation. If a peer receives an invitation (either in-band or out-of-band), the peer information contained in the invitation may be used to discover a (perhaps remote) peer.
- Cascaded discovery. If a peer discovers a second peer, the first peer may, with the permission of the second peer, view the horizon of the second peer to discover new peers, groups, and services.
- Discovery via rendezvous peers. A rendezvous peer is a special peer that keeps information about the peers it knows about. A peer that can communicate via a rendezvous peer, for example via a peer-to-peer protocol pipe, may learn of the existence of other peers. Rendezvous points may be helpful to an isolated peer by quickly seeding it with lots of information. In one embodiment, a web site or its equivalent may provide information of well-known peer-to-peer protocol rendezvous points.

In one embodiment, a peer-to-peer platform web of trust may be used. In a web of trust, a peer group creator may select initial discovery proxies, and may delegate to new peer members. Any peer, when trusted, can become a discovery proxy. Discovery proxies may propagate requests between each other for net-crawling discovery. New peers may be untrusted or low-trust peers, and may be typically difficult to find and have limited discovery range (this may help protect against misbehaviors and denial of service attacks). Trusted members are easier to discover. Peers may increase their discovery range as they become more trusted (discovery credential). Some peers may not need to discover beyond their initial net peer group range.

In one embodiment, a peer may go through a proximity network, which also may be referred to as a subnet or region, to try to find (discover) surrounding peers. The Internet includes the concept of subnets that are physically defined by physical routers that define regions in which computer systems are connected to one another. Within one of these regions, the peer-to-peer protocol uses multicast or other propagate mechanism to find peers. In one embodiment, a propagate discovery mechanism may be provided where one peer can propagate a discovery request through a local subnet. Peers that are in the subnet may respond to the discovery request. The propagate discovery mechanism may provide primarily close range discovery. In one embodiment, only peers that are in the same physical subnet (region) may respond. "Propagate" is at the conceptual level. Multicast is implemented by TCP/IP to provide propagate capabilities. Other transports may use other methods to implement propagate. For example, Bluetooth provides a different implementation of propagate which is not multicast.

The core discovery protocol may provide a format for a local peer to send a propagate message (a request to find information about other peers or peer groups in its local region or subnet) and also a format for a response message. A propagate may ask who's there (what peers are in the subnet). One or more peers may decide to respond. Other peers on the subnet may choose not to respond if they don't want to be discovered by the requesting peer. The response message may indicate that a peer is there and that the requesting peer may communicate with it if it wants more information. In one embodiment, the core peer-to-peer platform may define the format of the discovery requests and responses as part of the peer discovery protocol. In one embodiment, the messages may be XML messages.

One embodiment of a peer-to-peer platform may provide a bootstrapping process for peers. In one embodiment, a new peer may not know any peers or peer groups when bootstrapped. When bootstrapping, the peer may issue a peer discovery propagate message. The new peer is looking for one or more peers in the subnet. The new peer needs to reach some level of connectivity in order to support higher-level operations. From discovered peers, the new peer may acquire information needed to allow the new peer to go further in its bootstrapping process. For example, the new peer may send messages to another peer requesting information on services that the other peer may be aware of that the new peer needs for bootstrapping.

When the new peer discovers another peer or peers, it may attempt to discover peer groups. This process may be similar to the peer discovery process described above. The new peer may send (e.g. propagate) another discovery message that is configured to discover peer groups. Peers in the proximity network (region) that are aware of a peer group or peer groups may respond to the peer group discovery message, and may return information on the peer group(s) (e.g. peer group advertisements) of which they are aware. The new peer may use this information to determine a peer group or peer groups that it may be interested in joining.

In one embodiment, a peer group may be configured so that only a subset of peers within a group may have the capabilities to respond to peer group discovery messages and to provide information about the peer group to inquiring peers.

Peer and peer group discovery may both be implemented by the peer discovery protocol. Peer and peer group discover are more or less at the same level in the P2P platform. In one embodiment, peer discovery may use a message that indicates the discovery is looking for peers, and peer group discovery may use a similar message that indicates the discovery is looking for peer groups.

In one embodiment, the peer discovery protocol may be required to be implemented in a peer platform, and thus all peers will have the service running. When one peer sends (e.g. propagates) a request, then a receiving peer must send a response, unless it is configured to not respond to at least some requests from at least some peers based upon configuration parameters. In another embodiment, peers may be implemented without the peer discovery protocol. In other words, in this embodiment, peers are not required to implement the peer discovery platform. For example, on some smart devices, peer information and/or peer group information may be preconfigured into the device, and so bootstrapping may be performed on these devices without having to initiate a peer discovery.

Embodiments of the peer-to-peer platform may implement a discovery mechanism that is more suited for long-range discovery than the propagate method described above. In one embodiment, rendezvous peers may be used in discovery. A rendezvous peer may be described as a meeting point where peers and/or peer groups may register to be discovered, and may also discover other peers and/or peer groups, and retrieve information on discovered peers and/or peer groups. In one embodiment, a peer (any peer) in a peer group may decide to become or may be appointed or elected as a rendezvous peer in the group. The rendezvous peer may be advertised as a meeting point, and may be predefined on peers so that, for example, the peers, when starting up, may know to go to the rendezvous peer to find information about the peer-to-peer network. Rendezvous peers may act as information brokers or centralized discovery points so that peers can find information in an easy and efficient manner. As a peer group grows, a peer may become a rendezvous peer in the group. In one embodiment, a network of rendezvous peers may be constructed that may help to provide long-range discovery capabilities. A rendezvous peer may be aware of at least some of the other rendezvous peers in the network, and a discovery message from a peer may be forwarded from a first rendezvous peer to a second, and so long, to discover peers and/or peer groups that are "distant" on the network from the requesting peer.

Rendezvous peers may offer to cache advertisements to help others peers discover resources, and may propagate (forward) requests they cannot answer to other known rendezvous peers. A rendezvous peer may implement at least one of these two functions. The services provided by a rendezvous peer may be different than message routing. Message routing is performed at a lower level involving multi-hops connections to send a message between any peers in the network. In one embodiment, the forwarding of a request between two rendezvous peers may involve routing to propagate a request between two rendezvous, but this is transparent to the rendezvous service and done underneath.

In one embodiment, rendezvous peers may forward requests between each other. A rendezvous may be typically connected to a few other rendezvous peers. There may be as many rendezvous peers as peers in a peer group. Not every peer may be a rendezvous (e.g. if a peer has no caching capabilities or is isolated behind a firewall). In one embodiment, only rendezvous peers may forward a discovery request to another rendezvous peer. This restriction may serve to limit and control the exponential growth of request propagations within the network. Rendezvous peers may thus provide a simple throttle mechanism to control the propagation of requests. In one embodiment, sophisticated rendezvous peers may be deployed to filter and distribute requests for the best usage of network resources.

In one embodiment, a peer may be pre-configured with a pre-defined set of rendezvous peers. These bootstrapping rendezvous may help the peer discover enough network resources (peers, rendezvous, services) as it needs to support itself. In one embodiment, the pre-configured rendezvous are optional. A peer may be able to bootstrap by finding rendezvous or enough network resources in its proximity environment. If a peer does not know the information, it may ask the surrounding peers (hop of 1) if they know the answer. One or more peers may already have the answer. If no surrounding peers know the answer, the peer may ask its rendezvous peers to find advertisements. Peers are recognized as rendezvous peers in their peer advertisements. When a peer discovers a new peer, it can determine if this peer is a rendezvous. A peer may not be required to use all the rendezvous peers that it has discovered.

Rendezvous peers may forward requests among themselves. The discovery process continues until one rendezvous peer has the answer or the request dies. In one embodiment, there may be a Time To Live (TTL) associated with the request, so it is not infinitely propagated. As an example, suppose a peer A is attempting to discover a resource R on the network. Peer A issues a discovery request specifying the type (peer, peer group, pipe, service) of advertisements it is looking for. To initiate the Discovery, peer A sends a discovery request message as a single propagate packet to all its available endpoints. The packet may contain the requested peer advertisement, so the receiving peer can respond to the requester. Each discovery request identifies the initiator, and a unique request identification specified by the initiator of the request. When another peer receives the discovery request (assume peer B in this example), if it has the requested R advertisement, it will return to peer A the advertisement for R in a discovery response message. If Peer A does not get response from its surrounding peers (hop of 1), Peer A may send the request to its known rendezvous peers. If the rendezvous peers do not have the advertisement, they can propagate the request to all other rendezvous peers they know. When a rendezvous receives a respond to a request, the rendezvous MAY cache the R advertisement for future usage, before sending it to the requestor.

In one embodiment, the peer rendezvous capabilities may be embedded in the core discovery protocol of the peer-to-peer platform. Rendezvous peers may be protocol-based, and may broker more information than name servers that typically only broker names of entities. In one embodiment, a rendezvous peer may maintain indexes for entities in the peer-to-peer platform including peers, peer groups, and advertisements. These indexes are dynamic which are created as the peer group community grows and more peers join. As a group joins, some peers may decide to become rendezvous peers to help peers connect with other peers in the group.

The rendezvous peer is at the peer level. A rendezvous peer is not a "service." A rendezvous peer may be used as part of an infrastructure to construct services such as a DNS or other centralizing and index services. In one embodiment, services may interact with a rendezvous peer to obtain and/or manipulate information stored on the rendezvous peer to perform some task to make the system act more efficiently.

In a network of peers, some peers may elect themselves, through the discovery protocol, to become rendezvous peers. A rendezvous peer may act as a broker or discovery message router to route discovery messages to the right place. In other words, a rendezvous may act to route discovery requests to the right rendezvous peers. For example, a rendezvous peer may receive a message requesting information about peers that are interested in baseball. The rendezvous peer may know of another rendezvous peer that specializes in information about baseball. The first rendezvous peer may forward or route the message to the second rendezvous peer. In one embodiment, rendezvous peers may maintain connections to other rendezvous peers in order to provide discovery and routing functionality.

Rendezvous peers may support long-range discovery. For example, a first peer is at a remote location from a second peer. For one of these peers to find the other with a mechanism such as web crawling may be time consuming, since there maybe a lot of "hops" between the two peers. Rendezvous peers may provide a shortcut for one of the peers to discover the other. The rendezvous peer, thus, may serve to make the discovery process, in particular long-range discover, more efficient.

A peer-to-peer network may be dynamic. Peers and peer groups can come and go. Dynamic identifiers (addresses) may be used. Thus, routes between peers need to be dynamic. Rendezvous peers may provide a method for route discovery between peers that allows routing in the peer-to-peer network to be dynamic. In this method, the rendezvous peers may perform route discovery for peers when the peers send discovery messages to the rendezvous peers or when a peer is attempting to connect to another peer or peer group that is not in the local region of the peer. This method may be transparent to the requesting peer.

In one embodiment, the rendezvous peers may be able to cache advertisements. An advertisement may be defined as metadata or descriptions of a resource. An advertisement may include information necessary for an entity to connect to or use the resource, for example a service advertisement may include information for connecting to and using the service. Advertisements may be published to allow other entities to discover them. The rendezvous peer may provide the ability for services and applications to store and cache temporary, e.g. via a lease mechanism, advertisements. This may used, for example, when one service needs to connect to another service, and needs the pipe endpoint or communication channel that may be used to connect to the service. The pipe endpoint may be included in a service advertisement published on a rendezvous peer. Thus, in one embodiment, the rendezvous peer provides the ability for peers, peer groups, services and applications to advertise pipe endpoints and to discover pipe endpoints of services and applications. In one embodiment, the rendezvous protocol may use an index cache (e.g. on a peer serving as a rendezvous proxy). In one embodiment, the rendezvous protocol may be used across subnets (configurable at the peer group level). In one embodiment, the rendezvous protocol may be used across/through firewalls (e.g. gateways).

In one embodiment, the peer-to-peer platform may include a propagate policy for use in discovery. In one embodiment, propagation may be controlled using TTL (time to live). In another embodiment, propagation may be controlled using message counts. In one embodiment, the propagate policy may be used for subnet TCP/multicast (platform configurable). In one embodiment, the propagate policy may support HTTP gateways (platform configurable). In one embodiment, the propagate policy may be used through firewalls (e.g. need peer activation behind firewalls).

In one embodiment, the peer-to-peer platform may include an invite policy. In one embodiment, the invite policy may support the adding of new peers and peer groups (e.g. publish advertisements).

In one embodiment, the peer-to-peer platform may allow the persistent local peer caching of discovery information. In this embodiment, a peer may be allowed to cache advertisements discovered via the peer discovery protocol for later usage. Caching may not be required by the peer-to-peer platform, but caching may be a useful optimization. The caching of advertisements by a peer may help avoid performing a new discovery each time the peer is accessing a network resource. In a highly transient environment, performing the discovery may be necessary. In a static environment, caching may be more efficient.

In one embodiment, the peer-to-peer platform may support trusted discovery peers. In one embodiment, the peer-to-peer platform may use discovery credentials. In one embodiment, the peer-to-peer platform may allow credential delegation. In one embodiment, the peer-to-peer platform may support propagate proxies. In one embodiment, a propagate proxy may support TTL/message counts. TTL stands for Time To Live (how long the request lives in the system). In one embodiment, a propagate proxy may support net crawling. In one embodiment, a propagate proxy may provide "smart above" routing.

In one embodiment, a peer may not initiate a new discovery request until the minimum allowable interval between discoveries is reached. This limitation on the maximum rate of discoveries may be similar to the mechanism required by Internet nodes to limit the rate at which ARP requests are sent for any single target IP address. The maximum rate may be defined by each specific implementation transport bindings and exported to the application.

A message or messages may be used to get all known, reachable advertisements within a region on the network. This list may not be exhaustive, and may be empty. Named peers may also be located using the peer discovery protocol. A message may include a peer group credential of the probing (requesting) peer that may identify the probing peer to the message recipient. The destination address may be any peer within a region (a propagate message) or alternatively a rendezvous peer (a unicast message). A response message may return one or more advertisements (e.g. peer advertisements and/or peer group advertisements) that may include "main" endpoint addresses that may be converted to a string in the standard peer endpoint format (e.g. URI or URL) and may include a network transport name. It may not be guaranteed that a response to a query request will be made. The peer discovery protocol may not require a reliable transport. Multiple discovery query requests may be sent. None, one or multiple responses may be received.

In one embodiment, a discovery query message may be used to send a discovery request to find advertisements (e.g. for peers or peer groups). The discovery query may be sent as a query string (attribute, value) form. A null query string may be sent to match any results. A threshold value may be included to indicate the maximum number of matches requested by a peer. In one embodiment, a discovery response message may be used to send a discovery response message to answer a discovery query message.

Reverse Discovery

Reverse discovery means that, in a peer-to-peer network, when a first entity (e.g. a peer) discovers a second entity (e.g. another peer), the second entity may also discover the first entity from the discovery initiated by the first entity. This may also be referred to as "mutual discovery". In most traditional systems, discovery is typically one-directional. In the peer-to-peer world, reverse discovery is important because, by definition, all "peers" are equal (i.e. it is typically not a hierarchical system). In one embodiment, there may be different levels of discovery for peers. For example, a peer may be configured to remain anonymous when discovering other peers or to always support reverse discovery. In one embodiment, a peer initiating a discovery may also be configured to deny discovery to another peer if the other peer is configured or chooses to remain anonymous. In one embodiment, a peer may also be configured to or may choose to deny discovery by other peers that wish to remain anonymous.

Invitations

One embodiment of the discovery protocol may also provide methods by which a peer can "advertise" itself, for example when joining a peer-to-peer network. For example, a peer may send an email message, by telephone, by "traditional" mail, or by other methods to other peers it discovers or is preconfigured to know about to advertise its presence and willingness to be contacted by other peers. This is done outside of the discovery method, and may be performed by any external medium. A peer who receives an invitation from a peer may have a capability to add or enter the new peer to a list or database of peers that it knows about. When the peer later restarts, these peers may be among the preconfigured peers that the peer knows about. In one embodiment, a peer may have a "notify" or "invitation" interface to allow a user to initiate invitations. In one embodiment, the peer-to-peer platform may provide import and export capabilities for invitations. In one embodiment, the invitations may be implemented as documents external to the peer-to-peer system that may be exported from one peer and imported into another peer. In one embodiment, the invitations may be in a format that enables the exporting and importing. In one embodiment, the invitations may be in XML format. In one embodiment, an interface may be provided to allow the manual entering of invitation information. Importing the invitation may create a peer-to-peer platform document that may then be used by the peer. The format of exported documents may depend on the platform on which the peer is implemented.

Peer Resolver Protocol

In one embodiment, the peer-to-peer platform may include a peer resolver protocol that may allow a peer to send simple, generic search queries to one or more peer services. In one embodiment, only those peers that have access to data repositories and that offer advanced search capabilities typically implement this protocol. Each service may register a handler in the peer group resolver service to process resolver query requests. Resolver queries may be demultiplexed to each service. Each service may respond to a peer via a resolver response message. It is important to point the differences between the peer discovery protocol and the peer resolver protocol. The peer discovery protocol is used to search for advertisements to bootstrap a peer, and discover new network resources. The peer resolver protocol is a generic service that services query protocols. The peer resolver protocol may be used by a service on a peer to interact with a service on another peer.

The peer resolver protocol may enable each peer to send and receive generic queries to find or search for peer, peer group, pipe or service specific information such as the state of a service or the state of a pipe endpoint. Each resolver query may have a unique service handler name to specify the receiving service, and a query string to be resolved by the service. The peer resolver protocol may provide a generic mechanism for peers to send queries and receive responses. The peer resolver protocol may remove the burden for registered message handlers by each service and set message tags to ensure uniqueness of tags. The peer resolver protocol may ensure that messages are sent to correct addresses and peer groups. The peer resolver protocol may perform authentication and verification of credentials and the dropping of rogue messages. In one embodiment, there is no guarantee that a response to a resolver query request will be made. In one embodiment, a peer may not be required to respond to a resolver query request. In one embodiment, a reliable transport is not required by the peer resolver protocol. In one embodiment, multiple resolver query messages may be sent. None, one or multiple responses may be received.

In one embodiment, propagating a query to the next set of peers may be delegated to the peer rendezvous protocol. The rendezvous service may be responsible for determining the set of peers that may receive a message being propagated, but may not re-propagate an incoming propagated message. The decision of propagating a message one step further may be left to the service handling the message. The peer rendezvous protocol's policy may be that if the query handler does not instruct the peer rendezvous protocol to discard the query, and if the local peer is a rendezvous, then the query is re-propagated (within the limits of loop and time-to-live rules that may be enforced by the rendezvous service). In addition, if instructed by the query handler, an identical query may be issued with the local peer as the originator.

In one embodiment, a resolver query message may be used to send (unicast) a resolver query request to a service on another member of a peer group. In one embodiment, the resolver query may be sent as a query string to a specific service handler. Each query may include a unique identifier. The query string may be any string that may be interpreted by the targeted service handler. A resolver response message may be sent (unicast) to the requesting peer by the service handler. A resolver response message may be returned in response to a resolver query message.

Peer Information Protocol

Once a peer is located, its capabilities and status may be of interest. In one embodiment, the peer-to-peer platform may include a peer information protocol that may allow a peer to learn about other peers' capabilities and status. For example, a peer can send a ping message to see if another peer is alive. A peer may also query another peer's properties where each property has a name and a value string. A peer may not be required to respond to a peer information protocol request.

In one embodiment, messages may be used to get a list of named control "properties" exported by a peer. A property is a "knob" used to get information or configuration parameters from the peer. All properties may be named (e.g. using a string), and may be "read-only." In one embodiment, higher-level services may offer "read-write" capability to the same information, given proper security credentials. Each property may have a name and a value string. Read-write widgets may allow the string value to be changed, while read-only widgets may not. In one embodiment, the peer information protocol may only provide read access. The destination address is a peer's main endpoint that may have been returned in a discovery response message.

A reliable transport may not be required by the peer information protocol. In one embodiment, multiple peer information messages may be sent. None, one or multiple responses may be received. In one embodiment, a ping message may be sent to a peer to check if the peer is alive and/or to get information about the peer. The ping option may define the response type returned. In one embodiment, a full response (peer advertisement) or a simple acknowledge response (alive and uptime) may be returned. In one embodiment, a peer information response message may be returned in response to a ping message.

Peer Membership Protocol

In one embodiment, the peer-to-peer platform may include a peer membership protocol that may allow a peer to join or leave peer groups, and to manage membership configurations, rights and responsibilities. This protocol may allow a peer to obtain group membership requirements (such as an understanding of the necessary credential for a successful application to join the group), to apply for membership and receive a membership credential along with a full group advertisement, to update an existing membership or application credential, and to cancel a membership or an application credential. In one embodiment, authenticators and/or security credentials may be used to provide the desired level of protection.

In one embodiment, the process of joining a peer group may include obtaining a credential that is used to become a group member. In one embodiment, the process of joining a peer group may include obtaining a "form" listing the set of requirements asked of all group members. In one embodiment, this form may be a structured document (e.g. a peer group advertisement) that lists the peer group membership service.

In one embodiment, the peer membership protocol may define messages including, but not limited to, an apply message, a join message, an acknowledgement (ACK) message, a renew message, and a cancel message. A peer membership protocol apply message may be sent by a potential new group member to the group membership application authenticator. The authenticator's endpoint may be listed in the peer group advertisement of every member. In one embodiment, a successful response from the group's authenticator may include an application credential and a group advertisement that may list, at a minimum, the group's membership service. In one embodiment, the apply message may include, but is not limited to, the current credential of the candidate group member and the peer endpoint for the peer group membership authenticator to respond to with an acknowledgement (ACK) message.

A peer membership protocol join message may be sent by a peer to the peer group membership authenticator to join a group. The peer may pass an application credential (from an apply response ACK message) for authentication purposes. A successful response from the group's authenticator may include a full membership credential and a full group advertisement that lists, at a minimum, the group's membership configurations requested of full members in good standing. The message may include a credential (application credential of the applying peer: see ACK message). This credential may be used as the application form when joining. The message may also include the peer endpoint for the authenticator to respond to with an ACK message.

A peer membership protocol ACK message is an acknowledge message that may be used for both join and apply operations. A peer membership protocol ACK message may be sent back by the membership authenticator to indicate whether or not the peer was granted application rights to the peer group if the peer is applying, or full membership to the peer group if peer is attempting to join. In one embodiment, an ACK message may also be sent in response to peer membership protocol renew messages and cancel messages. The message may include a credential (an application or membership credential allocated to the peer by the peer group authenticator). The message may also include a more complete peer group advertisement that may provide access to further configurations. In one embodiment, not all configuration protocols are visible until the peer has been granted membership or application rights. Some configurations may need to be protected. In addition, depending on the peer credential, the peer may not have access to all the configurations.

A peer membership protocol renew message may be sent by a peer to renew its credential (membership or application) access to the peer group. An ACK (acknowledgement) message may be returned with a new credential and lease if the new is accepted. The renew message may include, but is not limited to, a credential (a membership or application credential of the peer) and the peer endpoint to which an ACK response message may be sent. A peer membership protocol cancel message may be sent by a peer to cancel the peer's membership or application rights in a peer group. The message may include, but is not limited to, a credential (a membership or application credential of the peer) and the peer endpoint to send an ACK message. In one embodiment, an ACK to a cancel may include a response status indicating the cancel was accepted.

Pipe Binding Protocol

In one embodiment, the peer-to-peer platform may include a pipe binding protocol that may allow a peer to find the physical location of a pipe endpoint and to bind a pipe advertisement to the pipe endpoint, thus indicating where messages actually go over the pipe. A pipe is conceptually a virtual channel between two pipe endpoints (input and output pipes) and may serve as a virtual link between two or more peer software components (e.g. services or applications).

A pipe may be viewed as an abstract, named message queue that supports a number of abstract operations such as create, open, close, delete, send, and receive. The pipe virtual link (pathway) may be layered upon any number of physical network transport links such as TCP/IP. Each end of the pipe may work to maintain the virtual link and to reestablish it, if necessary, by binding endpoints or finding the pipe's currently bound endpoints.

Actual pipe implementations may differ, but peer-to-peer platform-compliant implementations may use the pipe binding protocol to bind pipes to pipe endpoints. In one embodiment, during the abstract create operation, a local peer binds a pipe endpoint to a pipe transport. In another embodiment, bind may occur during the open operation. Unbind occurs during the close operation. In one embodiment, each peer that "opens" a group pipe may make an endpoint available (binds) to the pipe's transport. In one embodiment, messages may be sent only to one or more endpoints bound to the pipe. Peer members that have not opened the pipe may not receive or send any messages on that pipe. In one embodiment, when some peer software wants to accept incoming pipe messages, the receive operation may remove a single message in the order it was received, not in the order it was sent. In one embodiment, a peek operation may be used as a mechanism to see if any message(s) has arrived in the pipe's queue.

In one embodiment, the pipe binding protocol may define messages including, but not limited to, a query message and a response message. In one embodiment, a pipe binding protocol query message may be sent by a pipe pipe endpoint to find a pipe endpoint bound to the same pipe advertisement.

In one embodiment, the requester may ask that the information not be obtained from a cache. This is to obtain the most up-to-date information from a peer to address stale connection. The Peer field specifies a peer identifier. This peer is the one that should respond to the query. In one embodiment, there is no guarantee that a response to a pipe binding request will be made. A peer may not be required to respond to a binding request. A reliable transport may not be required. In one embodiment, multiple binding query messages may be sent. None, one or multiple responses may be received. In one embodiment, a pipe binding protocol response message may be sent to the requesting peer by each peer bound to the pipe in response to a query message.

Endpoint Routing Protocol

In one embodiment, the peer-to-peer platform may include an endpoint routing protocol. The endpoint routing protocol may be used by peers to send messages to router peers requesting available routes for sending message(s) to destination peers.

A peer-to-peer platform network is typically an ad hoc, multi-hops, and adaptive network by nature. Connections in the network may be transient, and message routing may be nondeterministic. Routes may be unidirectional and change rapidly. Peers may appear and leave frequently. Two communicating peers may not be directly connected to each other. Two communicating peers may need to use router peers to route messages depending on the network topology. For example, the two peers may be on different network transports, or the peers may be separated by a firewall or a NAT (Network Address Translation) router. A peer behind a firewall may send a message directly to a peer outside a firewall. However, a peer outside the firewall cannot establish a connection directly with a peer behind the firewall.

The endpoint routing protocol may define a set of request/query messages that is processed by a routing service to help a peer route messages to its destination. When a peer is asked to send a message to a given peer endpoint address, it may look in its local cache to determine if it has a cached route to this peer. If the peer does not find a route, it may send a route resolver query message to available peer routers requesting route information. A peer may have access to as many peer routers as it can find, or optionally a peer may be pre-configured to access certain routers.

Peer routers provide the low-level infrastructures to route a message between two peers in the network. Any number of peers in a peer group may elect themselves to become peer routers for other peers. Peers routers offer the ability to cache route information, as well as bridging different physical (different transport) or logical (firewall and NAT) networks. A peer may dynamically find a router peer via a qualified discovery search. A peer may find out if a peer it has discovered is a peer router via the peer advertisement properties tag.

When a peer router receives a route query, if it knows the destination (a route to the destination), it may answer the query by returning the route information as an enumeration of hops. The message may be sent to the first router and that router may use the route information to route the message to the destination peer. The route may be ordered from the next hop to the final destination peer. At any point the routing information may be obsoleted, requiring the current router to find a new route.

The peer endpoint may add extra routing information to the messages sent by a peer. When a message goes through a peer, the endpoint of that peer may leave its trace on the message. The trace may be used for loop detection and to discard recurrent messages. The trace may also be used to record new route information by peer routers.

In one embodiment, the endpoint routing protocol may provide the last resort routing for a peer. More intelligent routing may be implemented by more sophisticated routing services in place of the core routing service. High-level routing services may manage and optimize routes more efficiently than the core service. In one embodiment, the hooks necessary for user defined routing services to manipulate and update the route table information (route advertisements) used by the peer router may be provided by the endpoint routing protocol. Thus, complex route analysis and discovery may be performed above the core by high-level routing services, and those routing services may provide intelligent hints to the peer router to route messages.

Router peers may cache route information. Router peers may respond to queries with available route information. Route information may include a list of gateways along the route. In one embodiment, any peer may become a router peer by implementing the endpoint routing protocol.

The time-to-live parameter specifies how long this route is valid. The creator of the route can decide how long this route will be valid. The gateways may be defined as an ordered sequence of peer identifiers that define the route from the source peer to the destination peer. The sequence may not be complete, but at least a first gateway may be sufficient to initially route the messages. The remaining gateway sequence may be optional.

The endpoint routing protocol may provide messages including, but not limited to, a route request message and a route answer message from the router peer. In one embodiment, a peer may send a route request message to a router peer to request route information. Route information may be cached or not cached. In some cases, the route query request message may indicate to bypass the cache content and thus to search dynamically for a route. In one embodiment, it is not guaranteed that a route response will be received after a query is sent. In one embodiment, a router peer may send a route answer message to a peer in response to a route information request.

Routing

A peer-to-peer platform may provide a mechanism or mechanisms for searching and accessing peers, peer groups, content, services and other information in a dynamic topology of peers and peer groups, where peers and peer groups can come and go. In one embodiment, peers and peer groups may come and go potentially with limited or no control and notification. Peers may connect to a peer-to-peer network through various wired and wireless protocols, including "not connected" protocols such as may be used by mobile consumer devices such as pagers and PDAs. Peers may also have to cross boundaries, for example boundaries created by firewalls and NAT (Network Address Translation) routers, to connect to other peers.

In one embodiment, in order to bootstrap the system, and also in order to have a fallback mechanism if an application cannot or does not support one or more of the tasks, the core peer-to-peer protocols may be used in providing a discovery and router mechanism for discovering peers and other core abstractions such as advertisements, pipes, and peer groups. The discovery and routing mechanism of the peer-to-peer platform may use as few protocols as possible, is simple, and makes use of underlying optimizations when available. Hooks into the core discovery and router mechanism may be provided so that applications and services may participate in the discovery and router mechanisms, for example, by passing information to the core discovery and router mechanism.

In one embodiment, an application or service may be allowed to override the core discovery and router mechanism with its own custom mechanism.

Figure 17:
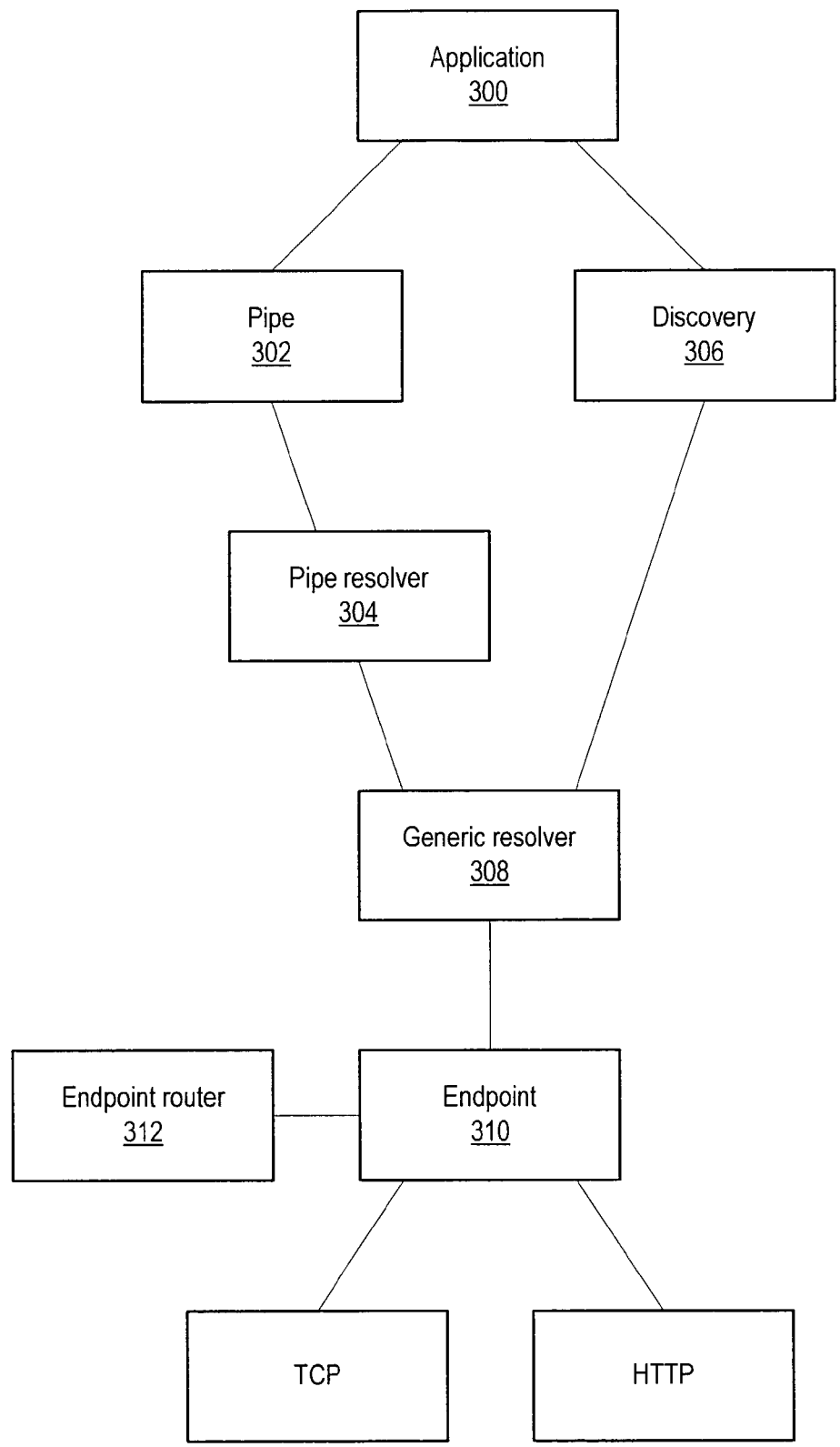
FIG. 17 illustrates several core components and how they interact for discovery and routing according to one embodiment.

FIG. 17 illustrates several core components and how they interact for discovery and routing according to one embodiment. Application 300 may use discovery 308 to find peers, peer groups, advertisements, and other entities on the peer-to-peer network, and may also publish pipe, peer, peer group, service, and other advertisements for access by other peers, applications and services on the peer-to-peer network. In one embodiment, the endpoint 310 may be responsible for exchanging messages between peers that are directly "connected" to each other (i.e. the peers can reach each other without any routing and/or discovering). When available, multicast may be used to discover peers that the endpoint can reach (multicast is a mechanism which has been introduced in IP in order to optimize this kind of process). In addition to that, or when multicast is not available, A rendezvous and invitation mechanism may also be provided. The rendezvous and invitation method may be used, for example, if multicast is not available. For example, HTTP does not provide multicast capabilities.

The endpoint router 312 may manage a cache of routes, for example routes to remote peers. In one embodiment, the endpoint router 312 may be configured from caching no routes to caching all routes it is aware of, depending on what the configuration wizard has decided with user control. The endpoint router 312 may also forward (route) messages depending on what is found in the cache, and what has been configured. For instance, the endpoint router 312 may be configured to route search (propagate) requests or to not route the requests.

In one embodiment, the generic resolver 308 is a protocol that implements a sort of RPC (query/response) protocol on top of the endpoint 310. Discovery 306 and pipe resolver 304 may use the generic resolver. In one embodiment, discovery 306 may be responsible for searching, caching and generating core advertisements (e.g. peer, peer group, and pipe advertisements). Discovery 306 may use the generic resolver 308 to send query messages and to receive answers. In one embodiment, discovery 306 may be aware of rendezvous peers and may have an invitation mechanism that may be used to assist the generic resolver 308. In one embodiment, the pipe resolver 304 may be responsible for localizing the receiving end of a pipe 302 given a pipe advertisement. In one embodiment, the pipe resolver 304 does not search for a pipe advertisement. In one embodiment, the pipe resolver 304 may be configured to manage a cache of the locations of the receiving ends (i.e. receiving peers) of the pipe 302.

The pipe protocol may use the endpoint 310 for transferring messages (with the potential help of the endpoint router 312) between the sending end of the pipe 302, and the receiving end of the pipe 302. In one embodiment, a pipe 302 may be viewed as an endpoint 310 that has not been bound to a particular peer. In one embodiment, a pipe 302 may be moved seamlessly from one peer to another. In one embodiment, a pipe 302 may also provides uniqueness that may not be provided by an endpoint 310 since a pipe identifier is unique in time and space, and an endpoint 310, being a network address, may not be.

Security

The security requirements of a P2P system are very similar to any other computer system. The three dominant requirements are confidentiality, integrity, and availability. These translate into specific functionality requirements that include authentication, access control, audit, encryption, secure communication, and non-repudiation. Such requirements are usually satisfied with a suitable security model or architecture, which is commonly expressed in terms of subjects, objects, and actions that subjects can perform on objects. For example, UNIX has a simple security model. Users are subjects. Files are objects. Whether a subject can read, write, or execute an object depends on whether the subject has permission as expressed by the permissions mode specified for the object. However, at lower levels within the system, the security model is expressed with integers, in terms of UID, GID, and the permission mode. Here, the low-level system mechanisms do not (need to) understand the concept of a user and do not (need to) be involved in how a user is authenticated and what UID and GID they are assigned.

In one embodiment, the peer-to-peer platform protocols may be compatible with widely accepted transport layer security mechanisms for message-based architectures such as Secure Sockets Layer (SSL) and Internet Protocol Security (IPSec). However, secure transport protocols such as SSL and IPSec only provide the integrity and confidentiality of message transfer between two communicating peers. In order to provide secure transfer in multi-hops network, a trust association may be established among all the intermediary peers. Security is compromised if anyone of the communication links is not secured.

The peer-to-peer platform security model may be implemented to provide a P2P web of trust. The web of trust may be used to exchange public keys among its members. Each peer group policy may permit some members to be trusted to the extent that they have the authority to sign public keys for other members as well as to do things like authenticate, add new members, and remove or revoke membership.

Embodiments may implement security classes for the RSA public key exchange, the RC4 byte stream cipher, and the SHA-1 hash algorithm, among others. These classes may enable privacy by the means of a P2P TLS implementation; integrity with signed hashes; non-repudiation using the web of trust; and MACs for data authenticity. Combinations of these classes may form security suites, and the peer-to-peer platform provides the mechanism to add new customized suites as required.

In some embodiments, for peer group authentication a separate Pluggable Authentication Module (PAM) may be provided. Embodiments may provide anonymous or guest login, and login with user name and password. A login session may be in clear or cipher-text as per the peer group security policy.

The security module may be available to the core level, and thus services, applications and advanced services and applications may plug in their own security components and protocols. For example, the web of trust may be defined by a policy that requires authorized peer group members to be well-known certificate authorities, and that peers exchange X509v3 CA signed certificates.

Given that the peer-to-peer platform is defined around the concepts of peers and peer groups, one embodiment may include a security architecture in which peer IDs and group IDs are treated as low-level subjects (just like UID and GID), codats are treated as objects (just like files), and actions are those operations on peers, peer groups, and codats.

The term "codat" as used herein refers to any computer content—code, data, applications, or other collection of computer representable resources. The peer-to-peer protocol may not distinguish among different types of resources that can be stored on a computer and shared among peers in a peer group. Examples of "codat" include text files, photographs, applets, executable files, serialized Java objects, SOAP messages, etc.

Codats are the elementary unit of information that is exchanged among peers. In this embodiment, given that codats may have arbitrary forms and properties, it may not be clear what sets of actions should be defined for them. In one embodiment, the codats may carry or include definitions of how they should be accessed. Such codats are analogous to objects, which define for themselves access methods others can invoke.

One or more of several other characteristics of the peer-to-peer platform may further affect the security requirements of the peer-to-peer platform. In one embodiment, the peer-to-peer platform may be focused on mechanisms and not policy. For example, UUIDs are used throughout, but they by themselves have no external meaning. Without additional naming and binding services, UUIDs are just numbers that do not correspond to anything like a user or a principal. Therefore, the peer-to-peer platform may not define a high-level security model such as information flow, Bell-LaPadula, or Chinese Wall. In one embodiment, when UUIDs are bound to external names or entities to form security principals, authenticity of the binding may be ensured by placing in the data field security attributes, for example, digital signatures that testify to the trustworthiness of the binding. Once this binding is established, authentication of the principal, access control based on the principal as well as the prevailing security policy, and other functions such as resource usage accounting may be performed.

The peer-to-peer platform may be neutral to cryptographic schemes and security algorithms. As such, the peer-to-peer platform may not mandate any specific security solution. In such cases, a framework may be provided where different security solutions can be plugged in. In one embodiment, hooks and placeholders may be provided so that different security solutions may be implemented. For example, every message may have a designated credential field that may be used to place security-related information. In one embodiment, exactly how to interpret such information is not defined in the peer-to-peer platform, and may be left to services and applications.

In one embodiment, the peer-to-peer platform may sometimes satisfy security requirements at different levels of the system. To allow maximum flexibility and avoid redundancy, the peer-to-peer platform may not force a particular implementation on developers. Instead, enhanced platforms based on the peer-to-peer platform may provide the appropriate security solutions to their targeted deployment environment. To illustrate the last point, two security concerns (communications security and anonymity) are examined.

Peers communicate through pipes. As an example, suppose both confidentiality and integrity in the communications channel are desired. In one embodiment, Virtual Private Networks (VPNs) may be used to move all network traffic. In one embodiment, a secure version of the pipe may be created, similar to a protected tunnel, such that any message transmitted over this pipe is automatically secured. In one embodiment, regular communications mechanisms may be used, and specific data payloads may be protected with encryption techniques and digital signatures. Embodiments of the peer-to-peer platform may accommodate one or more of these and other possible solutions.

Anonymity does not mean the absence of identity. Indeed, sometimes a certain degree of identification is unavoidable. For example, a cell phone number or a SIM card identification number cannot be kept anonymous, because it is needed by the phone company to authorize and set up calls. As another example, the IP number of a computer cannot be hidden from its nearest gateway or router if the computer wants to send and receive network traffic. In general, anonymity can be built on top of identity, but not vice versa. There may be multiple ways to ensure anonymity. In the examples above, it is difficult to link a prepaid SIM card sold over the retail counter for cash to the actual cell phone user. Likewise, a cooperative gateway or router may help hide the computer's true IP address from the outside world by using message relays or NAT (Network Address Translation).

In one embodiment, a peer-to-peer platform-based naming service may bind a peer to a human user. The user's anonymity may be ensured through the naming service, or the authentication service, or a proxy service, or any combination of these. The peer-to-peer platform may be independent of the solution chosen by a particular application.

At many places, the peer-to-peer platform may be independent of specific security approaches. In one embodiment, the peer-to-peer platform may provide a comprehensive set of security primitives to support the security solutions used by various peer-to-peer platform services and applications. Embodiments of the peer-to-peer platform may provide one or more security primitives including, but not limited to:

- A simple crypto library supporting hash functions (e.g., MD5), symmetric encryption algorithms (e.g., RC4), and asymmetric crypto algorithms (e.g., Diffie-Hellman and RSA).
- An authentication framework that is modeled after PAM (Pluggable Authentication Module, first defined for the UNIX platform and later adopted by the Java security architecture).
- A simple password-based login scheme that, like other authentication modules, can be plugged into the PAM framework.
- A simple access control mechanism based on peer groups, where a member of a group is automatically granted access to all data offered by another member for sharing, whereas non-members cannot access such data.
- A transport security mechanism that is modeled after SSL/TLS, with the exception that it is impossible to perform a handshake, a crypto strength negotiation, or a two-way authentication on a single pipe, as a pipe is unidirectional.
- The demonstration services called InstantP2P and CMS (content management service) also make use of additional security features provided by the underlying Java platform.

In one embodiment, peers, configurations, peer groups, and pipes form the backbone of the peer-to-peer platform. Security in some embodiments of the peer-to-peer platform may use credentials and authenticators (code (e.g. computer-executable instructions) that may be used to receive messages that either request a new credential or request that an existing credential be validated). A credential is a token that when presented in a message body is used to identify a sender and can be used to verify that sender's right to send the message to the specified endpoint and other associated capabilities of the sender. The credential is an opaque token that must be presented each time a message is sent. The sending address placed in the message envelope may be crosschecked with the sender's identity in the credential. In one embodiment, each credential's implementation may be specified as a plug-in configuration, which allows multiple authentication configurations to co-exist on the same network.

In one embodiment, all messages include, at a minimum, a peer group credential that identifies the sender of the message as a full member peer in the peer group in good standing. Membership credentials may be used that define a member's rights, privileges, and role within the peer group. Content access and sharing credentials may also be used that define a member's rights to the content stored within the group.

In one embodiment, the peer-to-peer platform may provide different levels of security. In one embodiment, APIs may be provided to access well known security mechanisms such as RCA. In one embodiment, the peer-to-peer platform may provide a distributed security mechanism in a peer-to-peer environment. In one embodiment, this distributed security may not depend on certificates administered by a central authority. The distributed security mechanism may allow a peer group "web of trust" to be generated. In the distributed security mechanism, peers may serve as certificate authorities (security peers). Each peer group may include one or more peers that may serve as a certificate authority in the group. In one embodiment, the creator of a peer group may become the default security authority in the group. In one embodiment, if there is more than one creator, the creator peers may choose one of the peers to be the security authority in the group. In one embodiment, the peer or peers that create a peer group may define the security methods that are to be used within the group (anywhere from no security to high levels of security). In one embodiment, more than one peer in a peer group may serve as a security peer. Since peers are not guaranteed to be up at all times, having multiple security peers in a peer group may help insure that at least one security peer is available at all times. In one embodiment, the peer group's certificate peer may verify keys to provide a weak level of trust. In one embodiment, peer-to-peer platform advertisements may include information to describe the security mechanism(s) to be used in a peer group. For example, the advertisement may include information to do public key exchange, information to indicate what algorithms are to be used, etc. The advertisement may also include information that may be used to enforce secure information exchange on pipes (e.g. encryption information).

In one embodiment, peer group security may establish a "social contract". The role of security is distributed across peer groups, and across members of peer groups, that all agree to participate by the rules. A peer group may establish the set of rules by which security in the group is enforced. A peer may join the peer group with a low level of security clearance (low trust). If the peer stays in the group and behaves (follows the rules), the peer may build up its level of trust within the group, and may eventually be moved up in its security level. Within peer groups operating under a social contract, certificates and/or public keys may be exchanged without the participation of a strict certificate authority; i.e. the members may exchange certificates based upon their trust in each other. In one embodiment, a peer group may use an outside challenge (e.g. a secret group password) that may be encrypted/decrypted with public/private keys, as a method to protect and verify messages within the group. In one embodiment, peer groups may be configured to use other types of security, including a high level of security, for example using a strict certificate authority, and even no security. In one embodiment, peer-to-peer platform messages exchanged within a group may have a "placeholder" for security credentials. This placeholder may be used for different types of credentials, depending upon the security implementation of the particular group. In one embodiment, all peer-to-peer messages within the group may be required to have the embedded credential. One embodiment may support private secure pipes.

CONCLUSION

Various embodiments may further include receiving, sending or storing instructions and/or data implemented in accordance with the foregoing description upon a carrier medium. Generally speaking, a carrier medium may include storage media or memory media such as magnetic or optical media, e.g., disk or CD-ROM, volatile or nonvolatile media such as RAM (e.g. SDRAM, DDR SDRAM, RDRAM, SRAM, etc.), ROM, etc. as well as transmission media or signals such as electrical, electromagnetic, or digital signals, conveyed via a communication medium such as network and/or a wireless link.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system comprising:
a plurality of nodes operable to couple to a network;
wherein the plurality of nodes are each configured to store reputation information for one or more of the other nodes, wherein the reputation information corresponding to a particular node is configured for use by others of the plurality of nodes to determine a reputation of the particular node during a transaction with the particular node;
wherein one of the plurality of nodes is configured to:
request reputation information for another one of the plurality of nodes on the network;
receive one or more responses to said request for reputation information for the other node from one or more of the plurality of nodes, wherein the responses to said request for reputation information for the other node each includes reputation information corresponding to the other node; and
determine a reputation of the other node from the received reputation information.

2. The system as recited in claim 1, wherein the node is further configured to:
perform a transaction with the other node if the reputation meets or exceeds a reputation threshold for the transaction; and
not perform the transaction with the other node if the reputation does not meet or exceed the reputation threshold for the transaction.

3. The system as recited in claim 2, wherein the node is further configured to modify the reputation of the other node after said transaction in accordance with a result of the transaction and a reputation of the other node prior to the transaction.

4. The system as recited in claim 2, wherein the node is further configured to distribute information corresponding to the transaction including the reputation of the other node to at least a subset of the plurality of nodes.

5. The system as recited in claim 2, wherein the node is further configured to:
divide information corresponding to the transaction into two or more segments; and
distribute the two or more segments of the information corresponding to the transaction to two or more of the plurality of nodes, wherein a first one of the two or more segments is distributed to at least a first one of said two or more of the plurality of nodes and a second one of the two or more segments is distributed to at least a second one of said two or more of the plurality of nodes.

6. The system as recited in claim 5, wherein a different one of the plurality of nodes is configured to:
obtain the two or more segments of the information corresponding to the transaction from the two or more nodes; and
reconstruct the information corresponding to the transaction from the obtained two or more segments.

7. The system as recited in claim 1, wherein the other node is configured to:
request reputation information for the node on the network;
receive one or more responses to said request for reputation information for the node from one or more of the plurality of nodes, wherein the responses to said request for reputation information for the node each includes reputation information corresponding to the node; and
determine a reputation of the node from the received reputation information.

8. The system as recited in claim 1, wherein, to determine the reputation of the other node from the received reputation information, the node is further configured to adjust the reputation of the other node using reputation information corresponding to the one or more nodes which provided responses to said request for reputation information for the other node.

9. The system as recited in claim 1, wherein, to determine the reputation of the other node from the received reputation information, the node is further configured to:
request reputation information for each of the one or more nodes which provided responses to said request for reputation information for the other node;
receive one or more responses to said request for reputation information for each of the one or more nodes from one or more others of the plurality of nodes, wherein each of the one or more responses to said request for reputation information corresponds to a particular one of the one or more nodes and includes reputation information corresponding to the particular node; and
adjust the reputation of the other node from the received reputation information corresponding to the one or more nodes which provided responses to said request for reputation information for the other node.

10. The system as recited in claim 1, wherein the node is further configured to distribute the reputation of the other node to at least a subset of the plurality of nodes.

11. The system as recited in claim 1, wherein the nodes are peer nodes participating in a peer-to-peer environment on the network.

12. The system as recited in claim 1, wherein the plurality of nodes is configured to implement a peer-to-peer environment on the network according to a peer-to-peer platform comprising one or more peer-to-peer platform protocols for enabling the plurality of nodes to discover each other, communicate with each other, perform the transactions, and share content in the peer-to-peer environment.

13. A system comprising:
a plurality of nodes operable to couple to a network;
wherein at least a subset of the plurality of nodes are each configured to store reputation information for one or more of the other nodes, wherein the reputation information corresponding to a particular node is configured for use by others of the plurality of nodes to determine a reputation of the particular node during a transaction with the particular node;
wherein each of the plurality of nodes is configured to:
determine a reputation for another of the plurality of nodes from reputation information corresponding to the other node stored on at least one of the at least a subset of the nodes; and
distribute the determined reputation to one or more of the at least a subset of the nodes.

14. The system as recited in claim 13, wherein, to determine a reputation for another of the plurality of nodes, the node is further configured to:
- request the reputation information for the other node on the network; and
- receive one or more responses to said request for reputation information for the other node from the at least one of the at least a subset of nodes, wherein the responses to said request for reputation information for the other node each includes particular reputation information corresponding to the other node.

15. The system as recited in claim 13, wherein the node is further configured to:
- perform a transaction with the other node if the reputation meets or exceeds a reputation threshold for the transaction; and
- not perform the transaction with the other node if the reputation does not meet or exceed the reputation threshold for the transaction.

16. The system as recited in claim 15, wherein the node is further configured to modify the reputation of the other node after said transaction in accordance with a result of the transaction and a reputation of the other node prior to the transaction.

17. The system as recited in claim 15, wherein the node is further configured to distribute information corresponding to the. transaction including the reputation of the other node among the at least a subset of the plurality of nodes.

18. The system as recited in claim 15, wherein the node is further configured to:
- divide information corresponding to the transaction into two or more segments; and
- distribute the two or more segments of the information corresponding to the transaction to two or more of the plurality of nodes, wherein a first one of the two or more segments is distributed to at least a first one of said two or more of the plurality of nodes and a second one of the two or more segments is distributed to at least a second one of said two or more of the plurality of nodes.

19. The system as recited in claim 18, wherein a different one of the plurality of nodes is configured to:
- obtain the two or more segments of the information corresponding to the transaction from the two or more nodes; and
- reconstruct the information corresponding to the transaction from the obtained two or more segments.

20. The system as recited in claim 13, wherein the other node is configured to:
- determine a reputation for the node from reputation information corresponding to the node stored on another at least one of the at least a subset of nodes; and
- distribute the determined reputation for the node among the at least a subset of the plurality of nodes.

21. The system as recited in claim 13, wherein, to determine a reputation for another of the plurality of nodes from reputation information corresponding to the other node stored on at least one of the at least a subset of nodes, the node is further configured to adjust the reputation of the other node using reputation information corresponding to the at least one of the at least a subset of nodes.

22. The system as recited in claim 13, wherein the nodes are peer nodes participating in a peer-to-peer environment on the network.

23. The system as recited in claim 13, wherein the plurality of nodes is configured to implement a peer-to-peer environment on the network according to a peer-to-peer platform comprising one or more peer-to-peer platform protocols for enabling the plurality of nodes to discover each other, communicate with each other, perform the transactions, and share content in the peer-to-peer environment.

24. A peer node, comprising:
- one or more network interfaces for coupling to a network;
- a memory comprising program instructions, wherein the program instructions are executable within the peer node to:
  - request reputation information for another peer node on the network, wherein the reputation information is configured for use by the peer node in determining a reputation of the other peer node during transactions involving the other peer node;
  - receive one or more responses to said request for reputation information for the other peer node from at least one other peer node on the network, wherein the responses to said request for reputation information for the other peer node each includes reputation information corresponding to the other peer node;
  - determine a reputation of the other peer node from the received reputation information; and
  - distribute the determined reputation of the other peer node to one or more other peer nodes on the network.

25. The peer node as recited in claim 24, wherein the program instructions are further executable within the peer node to:
- perform a transaction with the other peer node if the reputation meets or exceeds a reputation threshold for the transaction; and
- not perform the transaction with the other peer node if the reputation does not meet or exceed the reputation threshold for the transaction.

26. The peer node as recited in claim 25, wherein the program instructions are further executable within the peer node to:
- modify the reputation of the other peer node after said transaction in accordance with a result of the transaction and a reputation of the other peer node prior to the transaction; and
- distribute information corresponding to the transaction including the reputation of the other node to at least a subset of the plurality of nodes.

27. The peer node as recited in claim 25, wherein the program instructions are further executable within the peer node to:
- divide information corresponding to the transaction into two or more segments; and
- distribute the two or more segments of the information corresponding to the transaction to two or more other peer nodes, wherein a first one of the two or more segments is distributed to at least a first one of said two or more other peer nodes and a second one of the two or more segments is distributed to at least a second one of said two or more other peer nodes.

28. The peer node as recited in claim 24, wherein, to determine the reputation of the other node from the received reputation information, the program instructions are further executable within the peer node to adjust the reputation of the other peer node using reputation information corresponding to the at least one other peer node which provided responses to said request for reputation information for the other peer node.

29. The peer node as recited in claim 24, wherein the program instructions are further executable within the peer node to participate with other peer nodes in a peer-to-peer environment on the network according to a peer-to-peer platform comprising one or more peer-to-peer platform protocols for enabling peer nodes to discover each other, communicate with each other, perform the transactions, and share content in the peer-to-peer environment.

30. A method, comprising:
distributing reputation information for two or more nodes on a network among a plurality of nodes on the network, wherein the reputation information is configured for use by nodes receiving the information in determining a reputation of one or more of the two or more nodes during transactions involving the one or more of the two or more nodes;
requesting reputation information for a node on the network;
receiving one or more responses to said requesting reputation information for the node from at least one of the plurality of nodes, wherein the responses to said request for reputation information for the node each includes reputation information corresponding to the node; and
determining a reputation of the node from the received reputation information.

31. The method as recited in claim 30, further comprising:
performing a transaction with the node if the reputation meets or exceeds a reputation threshold for the transaction; and
not performing the transaction with the node if the reputation does not meet or exceed the reputation threshold for the transaction.

32. The method as recited in claim 31, further comprising modifying the reputation of the node after said transaction in accordance with a result of the transaction and a reputation of the node prior to the transaction.

33. The method as recited in claim 31, wherein the node is further configured to distribute information corresponding to the transaction including the reputation of the other node to at least a subset of the plurality of nodes.

34. The method as recited in claim 31, further comprising:
dividing information corresponding to the transaction into two or more segments; and
distributing the two or more segments of the information corresponding to the transaction among the plurality of nodes, wherein a first one of the two or more segments is distributed to at least a first one of said plurality of nodes and a second one of the two or more segments is distributed to at least a second one of said plurality of nodes.

35. The method as recited in claim 34, further comprising:
obtaining the two or more segments of the information corresponding to the transaction from the plurality of nodes; and
reconstructing the information corresponding to the transaction from the obtained two or more segments.

36. The method as recited in claim 30, wherein, in said determining the reputation of the node from the received reputation information, the method further comprises adjusting the reputation of the node from reputation information corresponding to the at least one of the plurality of nodes which provided responses to said requesting reputation information for the node.

37. The method as recited in claim 30, wherein, to in said determining the reputation of the node from the received reputation information, the method further comprises:
requesting reputation information for each of the at least one of the plurality of nodes which provided responses to said requesting reputation information for the node;
receiving one or more responses to said requesting reputation information for each of the at least one of the plurality of nodes from one or more others of the plurality of nodes, wherein each of the one or more responses to said request for reputation information corresponds to a particular node and includes reputation information corresponding to the particular node; and
adjusting the reputation of the other node using the received reputation information corresponding to the at least one of the plurality of nodes which provided responses to said request for reputation information for the node.

38. The method as recited in claim 30, further comprising distributing the reputation of the node to at least a subset of the plurality of nodes.

39. The method as recited in claim 30, wherein the nodes are peer nodes participating in a peer-to-peer environment on the network.

40. The method as recited in claim 30, wherein the plurality of nodes is configured to implement a peer-to-peer environment on the network according to a peer-to-peer platform comprising one or more peer-to-peer platform protocols for enabling the plurality of nodes to discover each other, communicate with each other, perform the transactions, and share content in the peer-to-peer environment.

41. A method comprising:
distributing reputation information for each of a plurality of nodes on a network among the plurality of nodes on the network, wherein the reputation information is configured for use by the nodes in determining a reputation of particular ones of the plurality of nodes during transactions between two of the plurality of nodes;
determining a reputation for a node of the plurality of nodes from reputation information corresponding to the node stored on one or more of the at least two of the plurality of nodes; and
distributing the determined reputation among the plurality of nodes.

42. The method as recited in claim 41, wherein, in said determining a reputation for a node of the plurality of nodes, the method further comprises:
requesting the reputation information for the node on the network; and
receiving one or more responses to said request for reputation information for the node from at least one of the plurality of nodes, wherein the responses to said request for reputation information for the node each includes reputation information corresponding to the node.

43. The method as recited in claim 41, further comprising:
performing a transaction with the node if the reputation meets or exceeds a reputation threshold for the transaction; and
not performing the transaction with the node if the reputation does not meet or exceed the reputation threshold for the transaction.

44. The method as recited in claim 43, further comprising modifying the reputation of the node after said transaction in accordance with a result of the transaction and a reputation of the node prior to the transaction.

45. The method as recited in claim 43, further comprising distributing information corresponding to the transaction including the reputation of the node to at least a subset of the plurality of nodes.

46. The method as recited in claim 43, further comprising:
dividing information corresponding to the transaction into two or more segments; and
distributing the two or more segments of the information corresponding to the transaction among two or more of the plurality of nodes, wherein a first one of the two or more segments is distributed to at least a first one of said two or more of the plurality of nodes and a second one of the two or more segments is distributed to at least a second one of said two or more of the plurality of nodes.

47. The method as recited in claim 46, further comprising:
obtaining the two or more segments of the information corresponding to the transaction from the two or more nodes; and
reconstructing the information corresponding to the transaction from the obtained two or more segments.

48. The method as recited in claim 41, wherein, in said determining for a node of the plurality of nodes from reputation information corresponding to the node stored on one or more of the at least two of the plurality of nodes, the method further comprises adjusting the reputation of the node from reputation information corresponding to the at least two of the plurality of nodes.

49. The method as recited in claim 41, wherein the nodes are peer nodes participating in a peer-to-peer environment on the network.

50. The method as recited in claim 41, wherein the plurality of nodes is configured to implement a peer-to-peer environment on the network according to a peer-to-peer platform comprising one or more peer-to-peer platform protocols for enabling the plurality of nodes to discover each other, communicate with each other, perform the transactions, and share content in the peer-to-peer environment.

51. An article of manufacture, comprising software instructions executable to implement:
distributing reputation information for two or more nodes on a network among a plurality of nodes on the network, wherein the reputation information is configured for use by nodes receiving the information to determine a reputation of one or more of the two or more nodes during a transaction involving the one or more nodes;
requesting reputation information for a node on the network;
receiving one or more responses to said requesting reputation information for the node from at least one of the plurality of nodes, wherein the responses to said request for reputation information for the node each includes reputation information corresponding to the node; and
determining a reputation of the node from the received reputation information.

52. The article of manufacture as recited in claim 51, further comprising:
performing a transaction with the node if the reputation meets or exceeds a reputation threshold for the transaction; and
not performing the transaction with the node if the reputation does not meet or exceed the reputation threshold for the transaction.

53. The article of manufacture as recited in claim 52, further comprising modifying the reputation of the node after said transaction in accordance with a result of the transaction and a reputation of the node prior to the transaction.

54. The article of manufacture as recited in claim 52, wherein the node is further configured to distribute information corresponding to the transaction including the reputation of the other node to at least a subset of the plurality of nodes.

55. The article of manufacture as recited in claim 52, further comprising:
dividing information corresponding to the transaction into two or more segments; and
distributing the two or more segments of the information corresponding to the transaction among the plurality of nodes, wherein a first one of the two or more segments is distributed to at least a first one of the plurality of nodes and a second one of the two or more segments is distributed to at least a second one of the plurality of nodes.

56. The article of manufacture as recited in claim 55, further comprising:
obtaining the two or more segments of the information corresponding to the transaction from the plurality of nodes; and
reconstructing the information corresponding to the transaction from the obtained two or more segments.

57. The article of manufacture as recited in claim 51, wherein, in said determining the reputation of the node from the received reputation information, the method further comprises adjusting the reputation of the node from reputation information corresponding to the at least one of the plurality of nodes which provided responses to said requesting reputation information for the node.

58. The article of manufacture as recited in claim 51, wherein, to in said determining the reputation of the node from the received reputation information, the method further comprises:
requesting reputation information for each of the at least one of the plurality of nodes which provided responses to said requesting reputation information for the node;
receiving one or more responses to said requesting reputation information for each of the at least one of the plurality of nodes from one or more others of the plurality of nodes, wherein each of the one or more responses to said request for reputation information corresponds to a particular node and includes reputation information corresponding to the particular node; and
adjusting the reputation of the other node using the received reputation information corresponding to the at least one of the plurality of nodes which provided responses to said request for reputation information for the node.

59. The article of manufacture as recited in claim 51, further comprising distributing the reputation of the node to at least a subset of the plurality of nodes.

60. The article of manufacture as recited in claim 51, wherein the nodes are peer nodes participating in a peer-to-peer environment on the network.

61. The article of manufacture as recited in claim 51, wherein the plurality of nodes is configured to implement a peer-to-peer environment on the network according to a peer-to-peer platform comprising one or more peer-to-peer platform protocols for enabling the plurality of nodes to discover each other, communicate with each other, perform the transactions, and share content in the peer-to-peer environment.

62. An article of manufacture comprising software instructions executable to implement:
distributing reputation information for each of a plurality of nodes on a network among the plurality of nodes on the network, wherein the reputation information is configured for use by the nodes in determining a reputation of particular ones of the plurality of nodes during transactions between two of the plurality of nodes;
determining a reputation for a node of the plurality of nodes from reputation information corresponding to the node stored on one or more of the at least two of the plurality of nodes; and
distributing the determined reputation among the plurality of nodes.

63. The article of manufacture as recited in claim 62, wherein, in said determining a reputation for a node of the plurality of nodes, the software instructions are further executable to implement:

requesting the reputation information for the node on the network; and receiving one or more responses to said request for reputation information for the node from at least one of the plurality of nodes, wherein the responses to said request for reputation information for the node each includes reputation information corresponding to the node.

64. The article of manufacture as recited in claim 62, wherein the software instructions are further executable to implement:

performing a transaction with the node if the reputation meets or exceeds a reputation threshold for the transaction; and not performing the transaction with the node if the reputation does not meet or exceed the reputation threshold for the transaction.

65. The article of manufacture as recited in claim 64, wherein the software instructions are further executable to implement modifying the reputation of the node after said transaction in accordance with a result of the transaction and a reputation of the node prior to the transaction.

66. The article of manufacture as recited in claim 64, wherein the software instructions are further executable to implement distributing information corresponding to the transaction including the reputation of the node to at least a subset of the plurality of nodes.

67. The article of manufacture as recited in claim 64, wherein the software instructions are further executable to implement:

dividing information corresponding to the transaction into two or more segments; and distributing the two or more segments of the information corresponding to the transaction among two or more of the plurality of nodes, wherein a first one of the two or more segments is distributed to at least a first one of said two or more of the plurality of nodes and a second one of the two or more segments is distributed to at least a second one of said two or more of the plurality of nodes.

68. The article of manufacture as recited in claim 67, wherein the software instructions are further executable to implement:

obtaining the two or more segments of the information corresponding to the transaction from the two or more nodes; and reconstructing the information corresponding to the transaction from the obtained two or more segments.

69. The article of manufacture as recited in claim 62, wherein, in said determining for a node of the plurality of nodes from reputation information corresponding to the node stored on one or more of the at least two of the plurality of nodes, the software instructions are further executable to implement adjusting the reputation of the node from reputation information corresponding to the at least two of the plurality of nodes.

70. The article of manufacture as recited in claim 62, wherein the nodes are peer nodes participating in a peer-to-peer environment on the network.

71. The article of manufacture as recited in claim 62, wherein the plurality of nodes is configured to implement a peer-to-peer environment on the network according to a peer-to-peer platform comprising one or more peer-to-peer platform protocols for enabling the plurality of nodes to discover each other, communicate with each other, perform the transactions, and share content in the peer-to-peer environment.

* * * * *